US000001814H

United States Statutory Invention Registration [19]

[11] Reg. Number: H1,814

Browning et al.

[45] Published: Nov. 2, 1999

[54] TELEPHONY-SUPPORT MODULE FOR A TELECOMMUNICATIONS SWITCHING PLATFORM

[76] Inventors: Mark David Browning, 3186 Valley Lake Dr., Bartlett, Tenn. 38135; Cecil W. Johnson, Jr., 8224 Meadow Vale Dr., Memphis, Tenn. 38125; Scott Arthur Kooy, 7104 River Run La., Memphis, Tenn. 38119; H. John Lohn, III, 957 Tara Woods Dr., Collierville, Tenn. 38017; Shawn Wayne Vines, 5528 Elmore Rd., Bartlett, Tenn. 38134; R. Timothy Wallace, 6890 Andrews Rd., Bartlett, Tenn. 38135

[21] Appl. No.: 09/026,321

[22] Filed: Feb. 19, 1998

Related U.S. Application Data

[60] Provisional application No. 60/060,107, Sep. 26, 1997.

[51] Int. Cl.[6] ..... H04M 1/00; H04Q 7/20

[52] U.S. Cl. ..... 379/242

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen "*Hybrid MicroSystems: The Ultimate Flexibility in Cellular Applications*", 1996, pp. 1–16, Celcore, Inc., Memphis, Tennessee.

"*GlobalHub Mobility Manager—Enables "One Number" PCS Service Via Motorola PPS Residential Products*" pp. 1–2, Celcore, Inc., Memphis, Tennessee, 1996.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*", Mar. 27, 1996, pp. 1–16, John Scourias.

Martin A. Iroff & Steve Chen, "A distribted GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

(List continued on next page.)

*Primary Examiner*—Daniel T. Pihulic

[57] ABSTRACT

A telephony-support module capable of responding to heartbeat messages and identifying itself as operational over one bus or both buses of a redundant-pair control bus. The module also has a reprogrammable, nonvolatile memory associated with it from which the module can run its operating system. The module can also transfer the operating system into another memory, allowing it to make updates to the operating system stored in the nonvolatile memory without interrupting its execution of its run-time operating code.

30 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"*BS–20/BS–21, D900/D1800 Base Transceiver Station*", pp. 1–2, Geschaftszweig Mobilfunknetze, Munchen, Germany, 1997.

"*ICs for Communications—Memory Time Switch Large MTSL*" Mar. 1995, pp. 1–15, Version 2.1, Siemens AG, Munchen, Germany.

"*ICs for Communication—Multipoint Switching and Conferencing Unit—Attenuation MUSAC–A*" Feb. 1996, pp. 1–68, Version 1.2, Siemens AG, Munchen, Germany.

"*ICs for Communications—Multichannel Network Interface Controller for HDLC MUNICH32*" Jan. 1996, pp. 1–252, Version 3.2, Siemens AG, Munchen, Germany.

"*Unique Solutions to Complex Challenges of Wireless Carriers*" pp. 1–9, Celcore, Inc., Memphis, Tennessee, 1997.

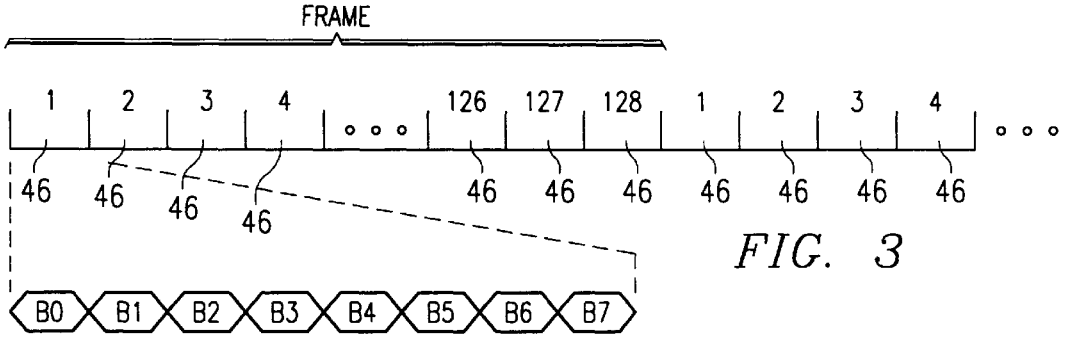
FIG. 3
FIG. 6
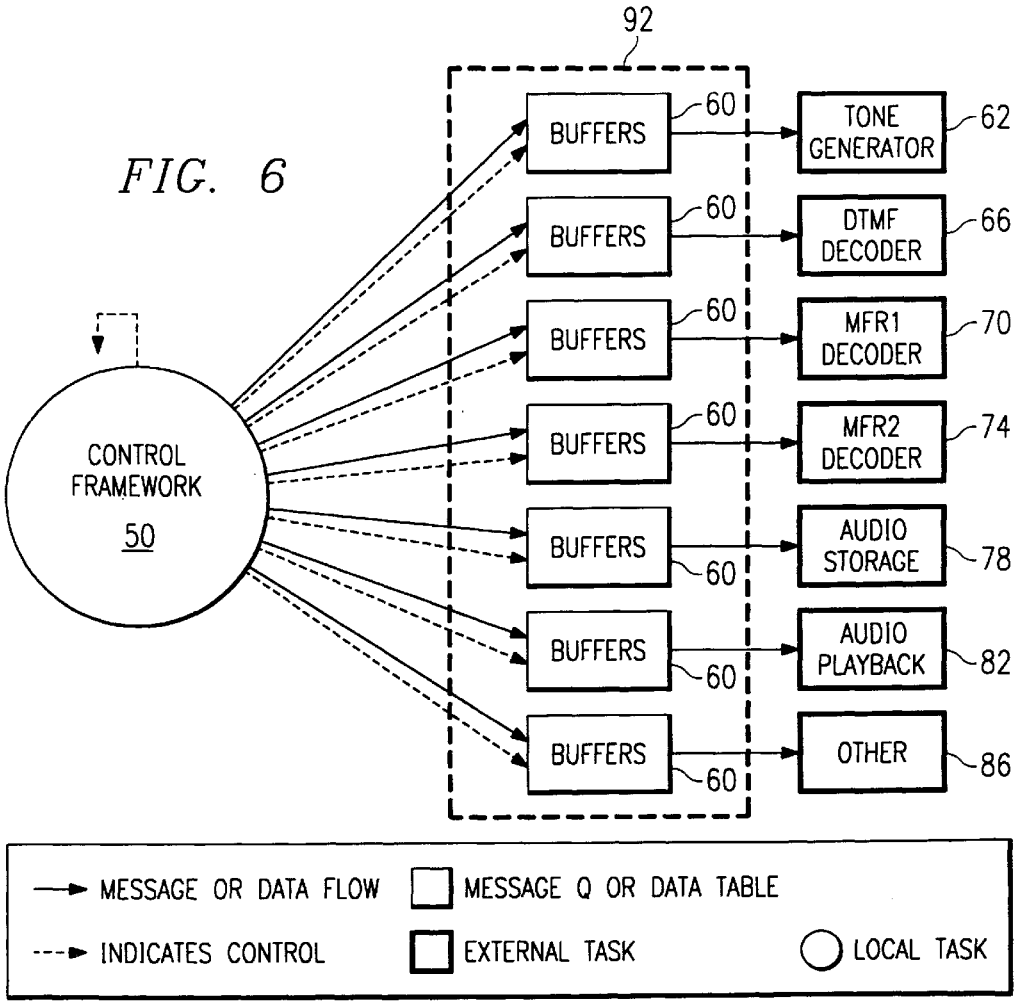

TO TDM
BACKPLANE BUSES

18
BUS
MULTIPLEXER
60
DSP4
58
DSP5
58
DSP2
58
DSP3
58
DSP0
58
DSP1
58
59
54
NONVOLATILE
MEMORY
52
MEMORY
LCOM
CONTROLLER
24
56
CONTROLLER
50
LOGIC
55
MEMORY
57

92
60
88
94
90
DMA
93
ADDRESS
REGISTER
DATA
REGISTER
DATA
BUFFER #n
BUFFER #2
BUFFER #1
COMMAND BUFFER POINTER
STATUS BUFFER POINTER
60
94
90
DMA
93
88
ADDRESS
REGISTER
DATA
REGISTER
DATA
BUFFER #n
BUFFER #2
BUFFER #1
COMMAND BUFFER POINTER
STATUS BUFFER POINTER

TELEPHONY-SUPPORT MODULE FOR A TELECOMMUNICATIONS SWITCHING PLATFORM

CLAIM OF PRIORITY

The instant patent application claims priority from the United States provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is related to the following patent applications: (a) the U.S. patent application Ser. No. 09/026,467 designated by DSC Case No. 840-00 and Attorney Docket No. 24194000.185, entitled "Fault Testing in a Telecommunications System," naming H. John Lohn III and Sarvesh Asthana as inventors, and which was filed concurrently with the instant application; (b) the U.S. patent application Ser. No. 09/026,229 designated by DSC Case No. 841-00 and Attorney Docket No. 24194000.186, entitled "System and Method for Dynamically Mapping Components Within a Telecommunications Switching Platform," naming H. John Lohn III as inventor, and which was filed concurrently with this application; (c) the U.S. patent application Ser. No. 09/025,740 designated by DSC Case No. 846-00 and Attorney Docket No. 24194000.191, entitled "Switching Module for a Telecommunications Switching Platform," naming Mark D. Browning, James M. Davis, Cecil W. Johnson, Jr., Scott A. Kooy, H. John Lohn III, and R. Timothy Wallace as inventors, and which was filed concurrently with this application; (d) the U.S. patent application Ser. No. 09/026,485 designated by DSC Case No. 847-00 and Attorney Docket No. 24194000.192, entitled "Span Interface Module for a Telecommunications Switching Platform," naming Mark D. Browning, Cecil W. Johnson, Jr., Scott A. Kooy, H. John Lohn III, and R. Timothy Wallace as inventors, and which was filed concurrently with this application; (e) the U.S. patent application Ser. No. 09/026,488 designated by DSC Case No. 848-00 and Attorney Docket No. 24194000.193, entitled "Signal-Processing Module for a Telecommunications Switching Platform," naming Mark D. Browning, James M. Davis, Cecil W. Johnson, Jr., Scott A. Kooy, H. John Lohn III, and R. Timothy Wallace as inventors, and which was filed concurrently with this application; (f) the U.S. patent application Ser. No. 09/026,486 designated by DSC Case No. 851-00 and Attorney Docket No. 24194000.196, entitled "System and Method for Forming Circuit Connections within a Telecommunications Switching Platform," naming James M. Davis, Scott A. Kooy, and H. John Lohn III as inventors, and which was filed concurrently with this application.

FIELD OF THE INVENTION

This invention generally relates to telecommunications systems and more particularly to mobile and land-based telecommunications switching platforms.

BACKGROUND OF THE INVENTION

Telecommunications switching platforms operate to connect incoming communication channels to selected outgoing communication channels. This switching is generally done in response to phone numbers dialed by the users or subscribers of the company operating the telecommunications system, or by others who are calling these subscribers. For example, the caller enters a phone number and signaling is sent along with or over the communication channel and the telecommunication system attempts to establish an end-to-end communications link to the destination number that the caller has dialed.

Certain support functions are generally provided by a telecommunications switching platform. Specifically, the telecommunications switching platform decodes signaling generated in response to keys input by the caller/subscriber so that the caller's voice channel may be connected to an appropriate destination information channel. In the process of connecting, other tones may be provided to the caller/subscriber. Specifically, if the switching platform is unable to connect the caller to the requested destination because the connecting trunk is busy, the switching platform provides the trunk busy tone. For incoming calls, the switching platform sends normal busy signals back to the far side connection if the local loop for the called party is busy. If the local loop or subscriber loop is not busy, the switching platform will send a ring signal until the subscriber answers. Thus, the switching platform will provide a number of different tones during the intermediate process of making end-to-end switching connections.

SUMMARY OF THE INVENTION

In a preferred embodiment of the present invention, a telephony-support module is provided. The telephony-support module preferably provides audio functions including trunk signaling such as MFR1 and MFR2, tone generation, digitized announcement record and playback, and tone decoding.

Within a telephony-support module, a microprocessor preferably directs the delivery of these tones and announcements. The microprocessor is preferably connected to volatile and nonvolatile memory and to digital signal processors (DSPs) to provide the tone delivery and announcement functions. The telephony-support module is operable to communicate with other resources and with high-level applications within the telecommunications switching platform through local communications protocols that in one embodiment are provided within the microprocessor.

In one embodiment, the tones and announcements are placed upon high-speed, time-multiplexed buses by the DSPs. The high-speed buses preferably have 128 information channels carrying tones or voice signals at 64 kbps. According to an embodiment of the invention, these tones and/or signals will be placed upon certain timeslots or channels on the high-speed buses. A switch, which is preferably a time-space-time switch, is preferably operable to switch any information channel of one of a plurality of input high-speed buses to any information channel of any one of a plurality of output high-speed buses. To allow for more efficient system power-up, the telephony-support modules of the present invention preferably have their operating systems stored in a nonvolatile memory that can be reprogrammed without removing it from the system. For instance, the nonvolatile memory might be a Flash memory, or an Electrically Erasable Programmable Read-Only Memory (EEPROM), or it might be a battery-backed Static Random Access Memory (SRAM), or it might another type of nonvolatile, reprogrammable memory. By keeping the operating system in a nonvolatile memory associated with the telephony-support module, the preferred embodiment platform eliminates the need for a time-consuming download of operating system code into a large number of volatile memories associated with the telephony-support modules in the platform. Instead, each telephony-support controller powers-up ready-to-operate with its own operating code. Then, if necessary, perhaps while the platform is already up and operating, new operating system code can be downloaded and programmed into the nonvolatile memory of the telephony-support modules without interruption to the system or delay in the system power-up.

BRIEF DESCRIPTION OF THE DRAWINGS

FIG. 3 is a timing diagram illustrating the multiplexing of telecommunications channels upon the high-speed buses of FIG. 2;

FIG. 6 is a software block diagram of the control framework, communications buffering, and software resources operating on the telephony-support module of FIG. 5;

Figure 1:
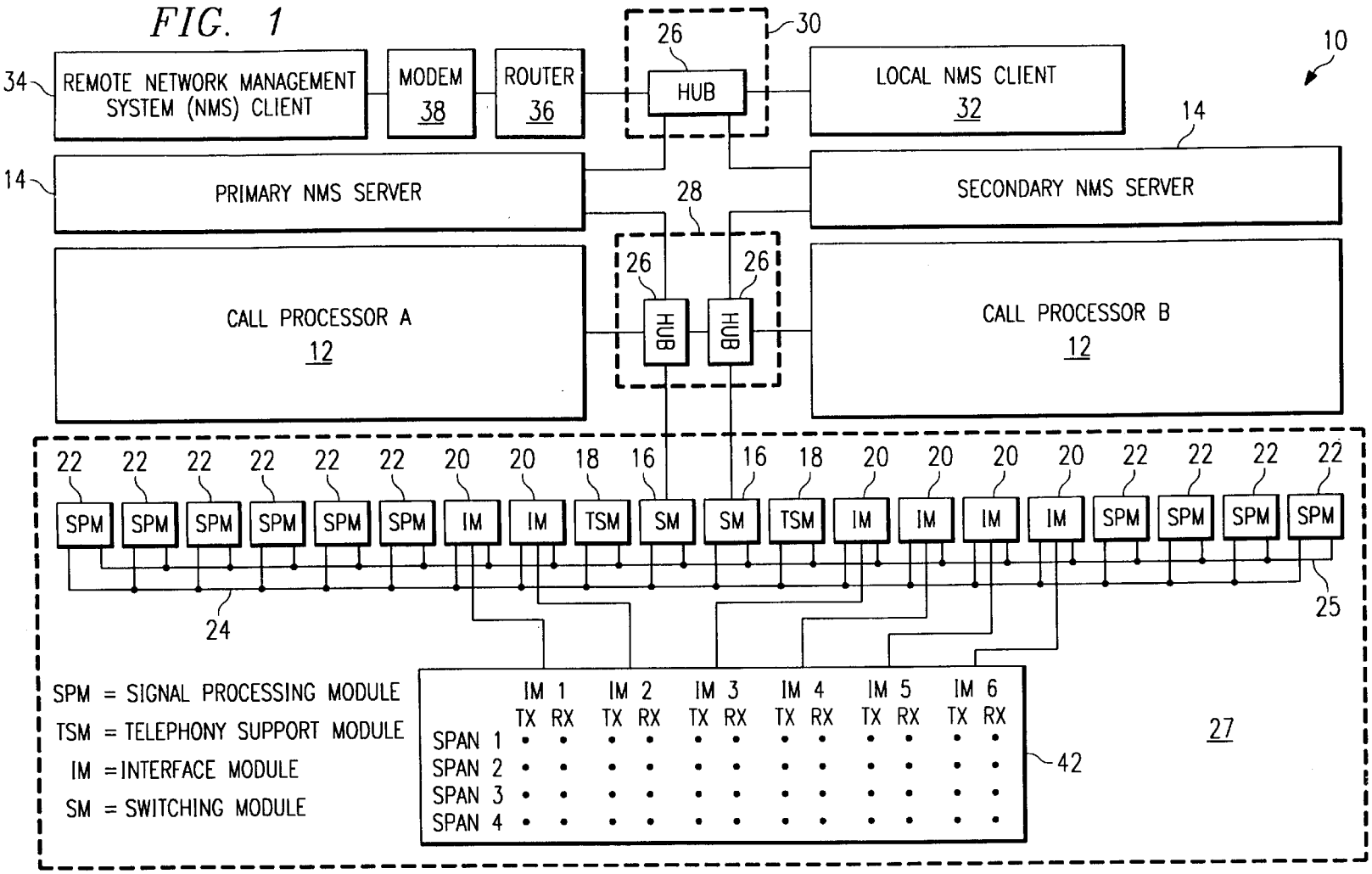
FIG. 1 is a block diagram of an embodiment of the claimed telecommunications switching platform.

All of these drawings are drawings of certain embodiments of the invention. The scope of the invention is not limited to the specific embodiments illustrated in the drawing and described below. Instead, the scope of the invention is set forth in the claims.

DETAILED DESCRIPTION OF EMBODIMENTS

FIG. 1 is a block diagram of an embodiment of the present invention. This block shows the overall telecommunications-switching platform 10. This switching platform 10 includes redundant call processors 12 and Network Management System ("NMS") servers 14 as well as switching modules 16 and resource processors 18,20,22 that carry out a number of the lower-level tasks to be accomplished by the switching platform 10. Resource processors include, for example, a telephony-support module 18, an interface module 20, and a signal-processing module 22. The resource processors are described below, and are described in further detail in U.S. patent application Nos.: 09/025,740 (Docket No. 24194000.191), entitled "Switching Module for a Telecommunications Switching Platform"; 09/026,485 (Docket No. 24194000.192), entitled "Span Interface Module for a Telecommunications Switching Platform"; 09/026,488 (Docket No. 24194000.193), entitled "Signal-Processing Module for a Telecommunications Switching Platform," all of which were filed on Feb. 19, 1998 and are hereby incorporated by reference herein.

The switching modules 16 and resource processors 18,20, 22 communicate with each other through, for example, a control bus 24. Data is passed between these same elements over high-speed data buses 25, which are preferably time-multiplexed serial data buses. The operation of these high-speed data buses 25 will be described in greater deal in FIGS. 2–3 and the text accompanying these figures.

Still referring to FIG. 1, the switching modules 16 preferably communicate with higher-level functional elements (the call processors 12, for example) within the platform 10 through communication hubs 26. In an embodiment of the present invention, logical communication paths are made between the resource processors 18,20,22 and the higher-level functional elements via the switching module 16 through, for example, TCP/IP sockets through the communication hubs 26. The higher-level functional elements are described in greater detail in U.S. patent application No. 60/060,107, entitled "Cellular Communication System," naming Anthony G. Fletcher and Scott D. Hoffpauir as inventors, and which was filed on Sep. 26, 1997, which is hereby incorporated by reference herein.

The communication hubs 26 connect the call processors 12 to the switching modules 16 and the NMS servers 14. Preferably, there are two distinct LANs 28,30 within the call processor 12. The first LAN 28 connects the redundant call processors 12 to the redundant NMS servers 14 and redundant switching modules 16 through redundant communication hubs 26. The second LAN 30 can connect the redundant NMS servers 14 to local NMS clients 32 and/or remote NMS clients 34. Connection to remote NMS clients 34 is preferably performed through a router 36 and a modem 38. Since there is no direct NMS client access to the first LAN 28 on which the call processors 12, the switching modules 16, or the resource processors 18,20,22 operate, the NMS servers 14 may serve as "firewalls" against hacker intrusion into the switching platform 10.

With further reference to FIG. 1, the interface modules 20 connect externally to telecommunication spans 40 (see FIG. 2), which are, for example, industry-standard T1 or E1 spans each carrying a number of information channels as specified by the particular standard. These information channels may be telecommunications traffic channels or telecommunications control channels, as will be discussed below. Connection to the spans are made through span signal paths 41 from the interface modules to a span connector panel 42, which is the point at which the telecommunication spans 40 (see FIG. 2) physically connect to the switching platform 10.

Collectively, the switching modules 16, resource processors 18,20,22, control buses 24, high-speed buses 25, span signal paths 41, and span connector panel 42 are referred to as the Input/Output Sub-System ("IOSS") platform 27. In one embodiment of the present invention, the IOSS platform 27 resides on a single shelf within a telecommunications equipment rack and performs the lower-level functions within the telecommunications switching platform 10.

Control bus 24 preferably comprises a pair of redundant control buses 24, over which the various resource processors 18,20,22 communicate using, for example, a Local COMmunication (LCOM) protocol. Although the high-speed data buses 25 are sometimes referred to as PCM buses, where PCM stands for Pulse Code Modulation, which is a digital voice encoding standard, the data carried on them may include control information, signaling information, data information, and voice information encoded using other standards. For example, voice information that has been encoded by a Global Standard for Mobile Communication (GSM) system are encoded using a certain type of Linear Predictive Coding (LPC).

Communication hubs 26 are preferably Ethernet Local Area Network (LAN) communication hubs, although the hubs 26 may be hubs for other local networking protocols such as, for example, Token Ring or StarLAN. The communication hubs 26 and protocols may operate using either wired or wireless connection schemes. Although the resource processors 18,20,22 preferably communicate with higher-level functional elements in the system through the switching module 16 via Transmission Control Protocol/Internet Protocol ("TCP/IP") sockets through the communication hubs 26, other networking protocols are possible. It is also possible, for example, to have such resource processors 18,20,22 directly connected to the higher-level elements in the system such that they will be directly addressed by these high-level elements using data and address buses.

"Lower-level" functions, which are described above as being performed by the IOSS platform 27 might be defined, for instance, as all functions within the Open System Interconnection ("OSI") framework as being below the Session Layer (Layer 4). Under such a division, the IOSS platform 27 would be responsible for communications routing and end-to-end delivery of information, including error recovery and flow control.

Figure 2:
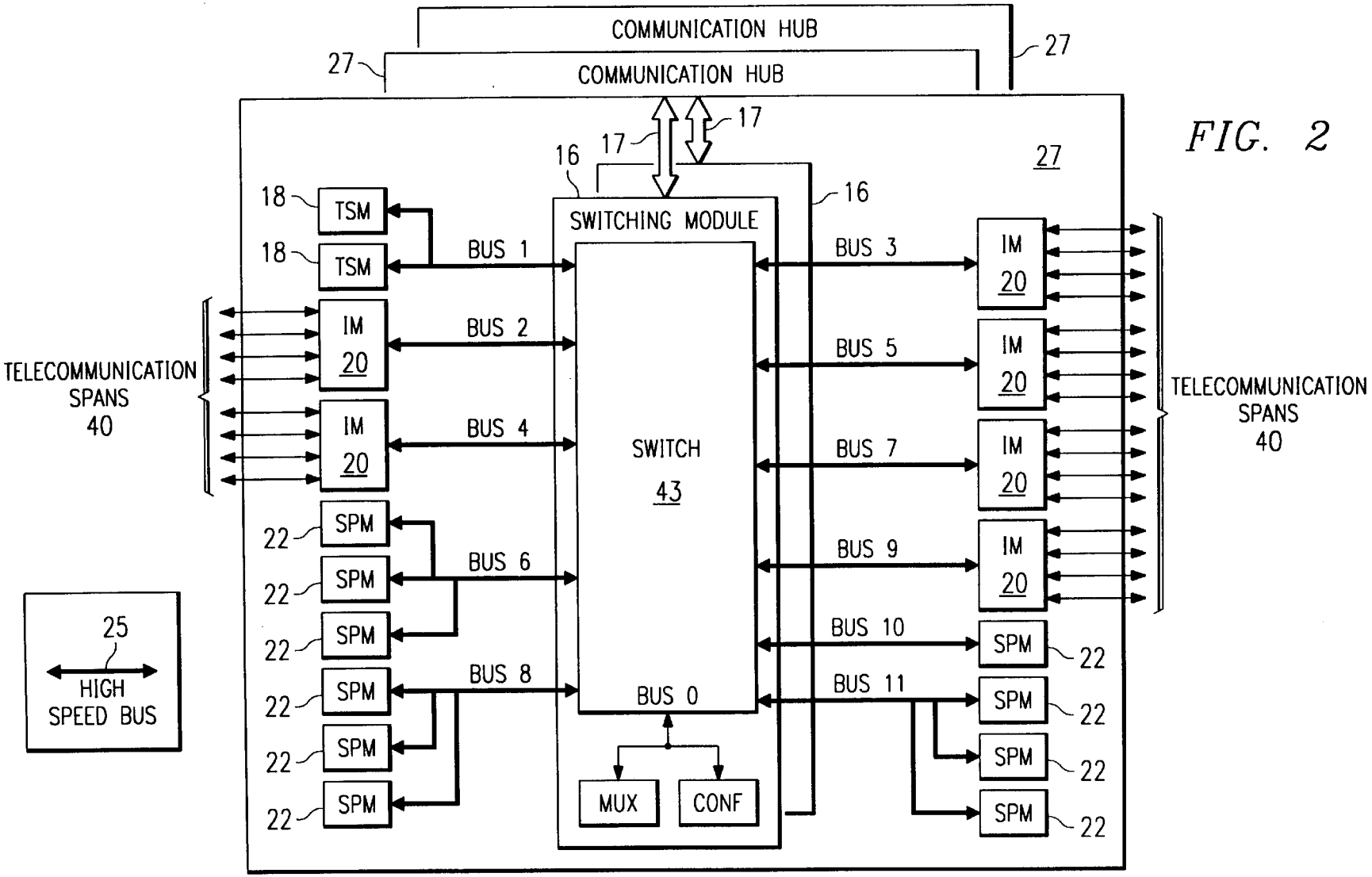
FIG. 2 is a block diagram of lower-level functional elements within the telecommunications switching platform of FIG. 1.

FIG. 2 is a block diagram of lower-level functional elements within a telecommunications switching platform 10. At the center of this block diagram are the redundant switching modules 16, which connect to the higher-level functional elements in the platform 10 through the communication hubs 26. In this embodiment, all communications between the higher-level functionality and the resource processors 18,20,22 are routed through, for example, the active, or ONLINE, switching module 16 instead of the inactive or OFFLINE one of the redundant switching modules 16.

The switching module 16 performs a number of functions. For example, one function of the switching module 16 is switching the telecommunication information channels arriving into the platform 10 through the telecommunications spans 40. As shown in FIG. 2, telecommunication spans 40 are connected to the interface modules 20. Information channels are transmitted within the spans 40 through, for example, time division multiplexing. The switching module 16 contains switches 43, which are responsible for making the connections between information channel inputs and information channel outputs according to commands from the higher-level functionality within the platform such as the call processor 12. The software function within the call processor 12 that controls switching of the information channels at the applications layer may be called the Resource Manager.

The switching platform 10 is also operable to, for example, receive from and transmit to GSM-standard mobile phones. Under the GSM standard, wireless voice channels are transmitted at 16 kbps ("kbps"), using LPC coding, whereas under many land-based telephony standards voice channels are transmitted at 64 kbps using PCM coding. Thus, in order to connect a mobile caller to a land-based called party, it is necessary to adapt the rate of the 16 kbps GSM voice channel to the land-based 64 kbps standard. This rate conversion is accomplished by, for example, a signal processing module 22.

With continued reference to FIG. 2, a GSM Base Transceiver Station (BTS) 44 (see FIG. 4) transmits four GSM voice channels on a 64 kbps DSO information channel. The telecommunications switching platform 10 connects the 64 kbps DSO channel from the BTS 44 to a signal-processing module 22 so that the signal-processing module 22 can convert this DSO information channel into four discrete 64 kbps PCM-encoded channels. These four 64 kbps information channels are then switched to four different information channels. The final switching of four channels to four different channels will accomplish the end-to-end switching, or will connect one or more of the GSM voice channels to one of the telephony-support functions (such as dial tones or tone generation or tone decoding).

Since voice connections are bi-directional or full-duplex, the connection process described above is carried out in the reverse order to receive signals from the land-based information channels. Thus, the switching module 16 connects one 64 kbps DSO channel to the signal-processing module 22, then connects the four 64 kbps channels outputs from the signal-processing module 22 to four different 64 kbps information channels, and these connections are duplicated in the reverse direction, for a total of 10 switch connections.

Still referring to FIG. 2, connection is made between the information channels and the resource processors 18,20,22 and the switching modules 16 through a series of high-speed buses 25. As shown in FIG. 2, there are a total of 12 such buses used in this embodiment. For future capacity expansion, spare high-speed buses 25 may be included within the telecommunications rack and switch 43 may be configured to switch information channels on these additional buses. This embodiment includes four such spares, for a total of 16 high-speed buses. Each of these buses 25 operate at an exemplary data rate of 8.192 megabits per second ("Mbps"),which gives each bus 25 a capacity for 4 E1 spans, each E1 span having a bit rate of 2.044 Mbps. Each of these buses 25 is logically subdivided into 128 timeslots 46 (see FIG. 3). Each of these 128 timeslots 46 may be, for example, a 64 kbps channel. To share each of these buses between the various resources within the telecommunications switching platform 10, each resource or incoming information channel is assigned a certain position or timeslot within the buses 25 to which they are attached. The present invention, as set forth in certain of the claims hereinbelow, includes a novel method for assigning, maintaining, and utilizing the assignment of these timeslots 46 (see FIG. 3) to the various resources and information channels within the platform 10.

The switching module 16 uses a switch 43 to make connections between a timeslot 46 on one bus 25 to a different timeslot 46 on that same bus 25 or another bus 25. In an embodiment of the present invention, the switching module 16 is capable of connecting any of 2048 inputs to 2048 outputs. All of these connections can preferably be maintained simultaneously. The resources used within the switching platform 10 may be dynamically assigned based on system needs. As mentioned, the interface modules 20 form the entry and exit points for telecommunications spans 40 that are connected to the switching platform 10. Each of these interface modules 20 is capable of handling, for example, four E1 spans 40. Each E1 span may be comprised of 32 channels including 30 voice channels transmitted at 64 kbps, one 64 kbps framing channel, and one 64 kbps signaling channel. There are a total of six interface modules 20 shown in FIG. 2, each of which is preferably capable of handling four spans 40.

The switch 43 is preferably a Time-Space-Time switch, which is a space switch (i.e., a matrix switch) interposed between two time switches.

FIG. 3 shows how telecommunications channels may be multiplexed onto a single high-speed bus 25. In this embodiment, 128 traffic and/or information channels are multiplexed together to form a single frame that repeats every 125 μs. Each of the timeslots 46, which are numbered 1 through 128 in FIG. 3 and begin repeating again after 128 timeslots, preferably comprises a group of eight contiguous bits occurring every 125 μs. These repeating groups of bits are designated in the exemplary timeslot 1 (as shown by the break-out figure for that timeslot) as B0 through B7.

Figure 4:
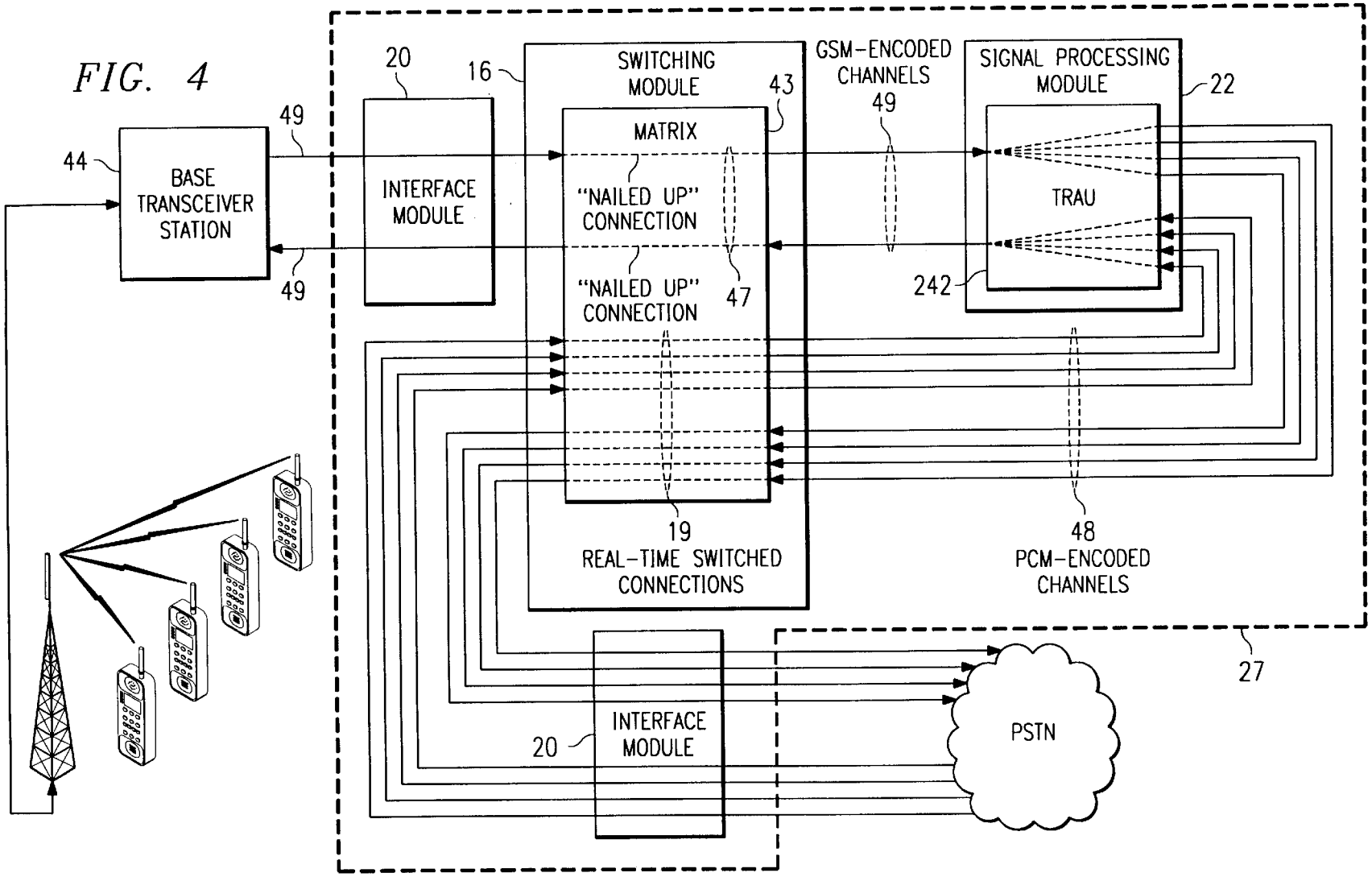
FIG. 4 is a system-level block diagram illustrating how connections may be formed through the telecommunications switching platform of FIG. 1.

FIG. 4 illustrates how connections may be formed through a telecommunications switching platform 10. In this embodiment, four GSM mobile phones are shown in wireless communication with a BTS 44. By the time the GSM-encoded voice signals are transmitted from the BTS 44 to the switch platform 10, they form a 64 kbps DSO information channel 49, which would preferably be transmitted within a telecommunications span 40 as discussed above. The span 40 is then received by the interface module 20 and is passed from there to the switching module 16. Because there is no reason to change the assignment of this GSM-encoded information channel 49 into the switching module 16, and because the GSM-encoded information channels 49 will preferably always have to be rate-adapted by the signal-processing module 22, it is advantageous to semi-permanently connect and assign the information channel to the signal-processing module 22. This semi-permanent connection is referred to as an "nailed-up" connection 47. In accordance with this designation, the addressing information required to maintain this connection through the switch 43 is stored in a configuration table within the switching module 16. The addressing information is maintained there until the system is reconfigured or until an error occurs such as a component failure or a board is removed—which would require the connections to be reconfigured.

Still referring to FIG. 4, within the signal-processing module 22, a DSO channel comprising four 16 kbps GSM voice channels is expanded into four PCM-encoded information channels 48. This expansion is shown within the Transcoder Rate Adaptation Unit ("TRAU") functional block of the signal-processing module 22. These four PCM-encoded voice channels are then passed again back through the switching module 16. Since these various voice channels are switched in real time so that the GSM telephone users can make and receive phone calls to different individuals, the switching module 16 makes real-time switching assignments or connections 19 for these PCM-encoded voice channels 48. Thus, the switching module 16 dynamically updates the connection information describing how the circuits will be switched through the switch 43. In this example, the four PCM-encoded voice channels 48 are all passed through the same or different interface modules 20 and are then transmitted to the Public Switched Telephone Network (PSTN).

Instead of connecting GSM callers to other parties through the PSTN, a GSM caller may call another GSM mobile telephone also connected to the same telecommunications switching platform 10. In that circumstance, one of the PCM-encoded voice channels 48 would be re-routed through the switch 43 to another channel of a signal-processing module 22 to be rate-adapted back to a 16 kbps GSM-encoded information channel 49 and then passed again through the switching module 16 and through the original or another interface module 20 to the same or another BTS 44. Again, the routing involved in such an end-to-end connection through the switching platform 10 can be very complex.

Figure 5:
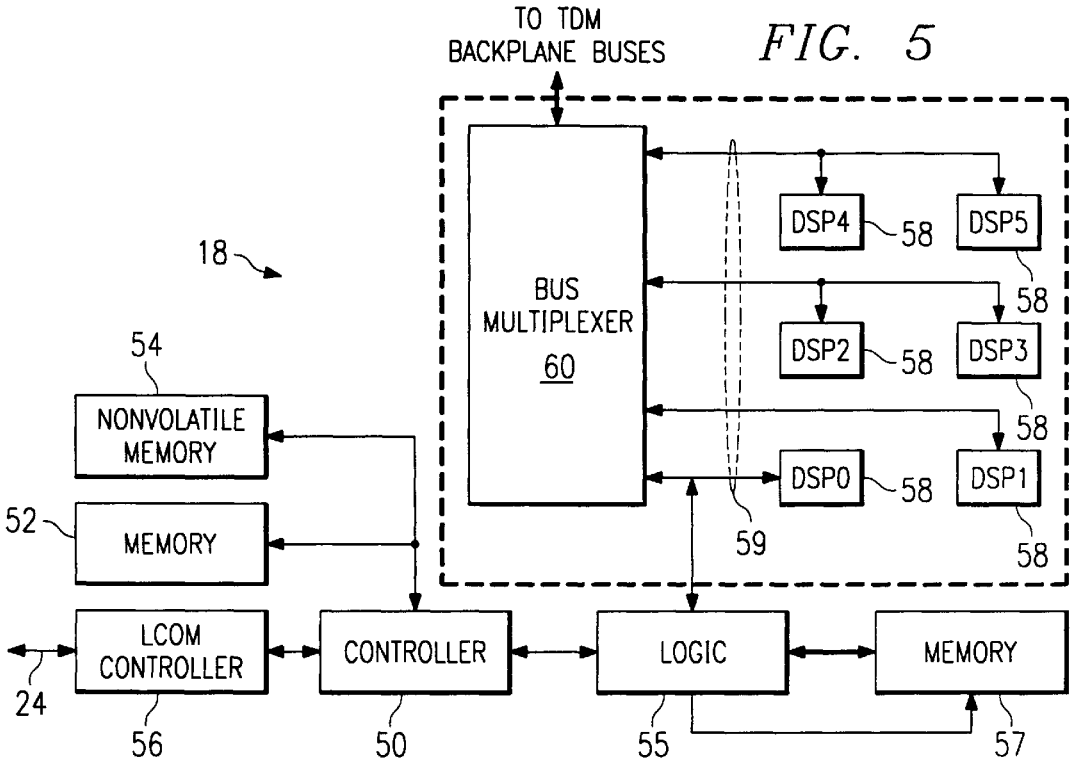
FIG. 5 is a block diagram of the telephony-support module of FIGS. 1–2.
Figure 7:
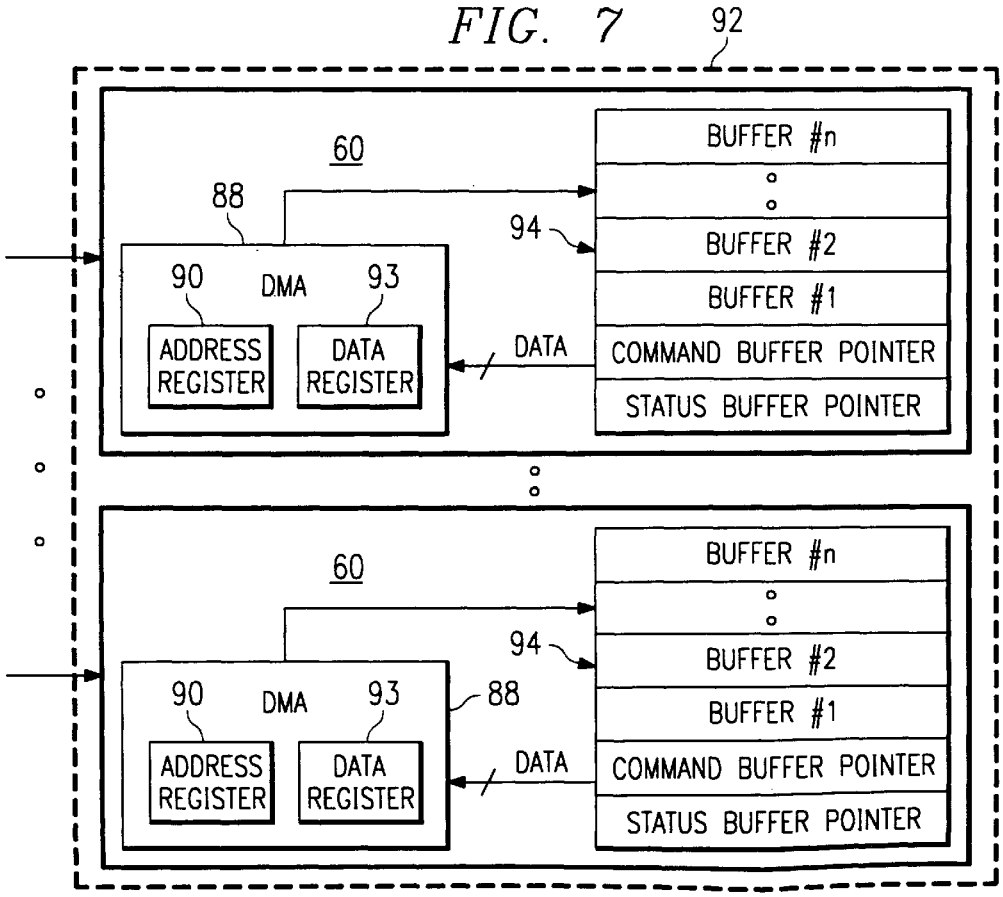
FIG. 7 is a block diagram of an embodiment of the hardware supporting the communications buffering function of FIG. 6.

With reference now to FIG. 5, a block diagram of the telephony-support module 18 is shown. Depending upon system needs, there could be a single telephony-support module 18, or there could be provided a redundant support module 18. If a redundant setup were used, the telephony-support modules 18 would be placed on a single high-speed bus 25 as shown in FIG. 2. The telephony-support module 18 comprises a controller 50 for managing the functions provided by the telephony-support module 18. There is also a memory 52 for data and real-time executable code storage and a nonvolatile memory 54 for storage of, for example, the telephony-support module's boot code or other nonvolatile code.

To allow for more efficient system power-up, the telephony-support modules 18 of the present invention preferably have their operating systems stored in the nonvolatile memory 54, which can be reprogrammed without removing it from the system. For instance, the nonvolatile memory 54 might be a Flash memory, or an Electrically Erasable Programmable Read-Only Memory (EEPROM) or it might be a battery-backed Static Random Access Memory (SRAM), or it might another type of nonvolatile, reprogrammable memory. By keeping the operating system in a nonvolatile memory 54 associated with the telephony-support module 18, the preferred embodiment platform 10 eliminates the need for a time-consuming download of operating system code into a large number of volatile memories 54 associated with the telephony-support modules 18 in the platform 10. Instead, each controller 50 powers-up ready-to-operate with its own operating code. Then, if necessary, perhaps while the platform is already up and operating, new operating system code can be downloaded and programmed into the nonvolatile memories 54 of the telephony-support modules 18 without interruption to the system or delay in the system power-up.

The download of the operating code from the high-level elements in the system preferably comprises the access of a hard disk drive connected to the call processors 12. Within the hard drive is stored a number of files containing the operating code for various processors on the switching modules 16 and resource processors 18,20,22 in the telecommunication switching platform 10. For example, a number of files might be assigned as follows according to the particular module in the switching platform and the resources operating on the modules:

| | Module Names | | | |
|---|---|---|---|---|
| Process | SDM | PSM | SPM | QSM |
| Boot Code | X | X | X | X |
| Operating Code | X | X | X | X |
| FPGA Code | X | X | X | X |
| R2 Signaling Code | | X | | X |
| Voice Message Code | | X | | |
| DSP Code | | X | X | |

Thus, for each cell in the above table that is marked with an "X", the call processor 12 and its associated hard drive (or other storage device) preferably will maintain a file containing operating code for the indicated process. If a resource processor wakes up already having valid operating code stored in it, the resource processor will begin operating from that code. If, on the other hand, a resource processor does not contain valid operating code on start-up, it will have to wait until at least some of these files are downloaded to it before it can begin operating. Also, when file updates are made to these operating code files, the Resource Manager level of the call processor can request that these file updates be made to the various resource processors 18,20,22 and switching modules 16.

The download of each of the files will preferably have a particular format that will identify the type of file that is being downloaded. Particularly, the file will have a file signature that identifies the generation of switching platform on which the file is to reside, the particular module, and the type of code within the particular module. The format of the file will preferably be as follows:

| | FILE HEADER - 32 BYTES | | | FILE | END-OF-FILE & CRC |
|---|---|---|---|---|---|
| JUMP | FILE SIGNATURE | VERSION | LENGTH | FILE | EOF + CRC |

In the above file format, the first two bytes are preferably a JUMP code, which are preferably used only for the controller in the resource processor. Files not intended for the controller might include a false jump code such as, for example, "00." The "EOF" code is optional and preferably not needed in the file format, since there is a "LENGTH" field.

The flexible use of the volatile/nonvolatile memory arrangement described above allows the telecommunication switching platform 10 to download country-specific tone tables into the nonvolatile memory to be used as a part of the telephony-support module's 18 operating code. This gives the system significant flexibility in configuration for the often-unique signaling tones used in countries throughout the world. In the same way, the characteristic function of the tone-encoding and -decoding algorithms used by the DSPs 58 can be flexibly changed and updated. The tone-encoding and -decoding algorithms used by the DSPs 58, for example, can be adapted or programmed to handle multiple standards.

Another purpose served by the nonvolatile memory 54 within the telephony-support module 18 could be for storage of voice messages when voice messaging is a function supported by the telephony switching platform 10. In another embodiment, another memory 57 can be used to store such voice messages. The telephony-support module 18 further includes a local communications (LCOM) controller 56 that is operable to communicate with the other resource processors 18,20,22, and particularly with the switching module 16 through the redundant control buses 24.

Functions that may be performed by the telephony-support module 18 include voice messaging and tone decoding and generation for tones such as DTMF and MFR1/MFR2. Other functions include the generation of dial tones, busy signals, ring signals, and trunk busy signals. For example, when a telephone subscriber wishes to place a call, the phone number is entered by pressing numbers on the keypad of his phone.

The phone generates signaling in the form of tones that identify the numbers that were pressed by the caller. These tones are passed over an information channel associated with the calling subscriber. The switching platform 10 processes these tones by switching them to the telephony-support module 18, which decodes the tones. These tones may be in the form of MFR1, MFR2, or DTMF tones, or may be tones of another format. Once these tones have been decoded, the call processor 12 seeks to make a connection in accordance with the entered phone number. The call processor 12 then determines which information channel should be connected through to the subscriber. As the switching platform 10 seeks to make a connection to the number sought by the subscriber, tones are provided by the telephony-support module 18 to the subscriber's assigned information channel. These tones would include busy signals and ring signals. Throughout the establishment of a connection, the switching module 16 is continually making and breaking new connections between the subscriber's assigned information channel and various resources within the switching platform 10.

With further reference to FIG. 5, the function of generating and interpreting tones that are carried over the information channels is called upon when the switching platform 10 is attempting to establish connections between a subscriber and the party that the subscriber has dialed. The telephony-support module 18 interprets tones generated in response to keys pressed by the calling party subscriber, and provides either a busy signal, a ring signal, or some other signal, as the switching platform 10 attempts to make a connection to the called party. The DSPs 58 are responsible for this tone interpretation and generation.

A bus multiplexer 60 is provided to make the appropriate connections between information channels that have been routed to the telephony-support module 18 and the appropriate to resources within the telephony-support module 18. Specifically, under the direction of the controller 50, the bus multiplexer 60 places incoming tones signals on the appropriate timeslot to be interpreted by one of the DSPs 58, and will read signals from the DSPs 58 and placed them on that high-speed bus 25 in the appropriate timeslot.

Also, under direction of the controller 50, voice messages will be played back from the voice-message memory 57 or stored therein. Again, the bus multiplexer 60, under the controller's 50 direction, will extract the incoming voice channels from the appropriate timeslots of the high-speed bus 25 and direct them to the appropriate address within the voice-message memory 57. In the reverse direction, the bus multiplexer 60 will read the stored messages from the voice-message memory 57 and place these messages in the appropriate timeslot on the high-speed bus 25.

Still referring to FIG. 5, the high-speed bus 25 comprises 128 transmit timeslots and 128 receive timeslots; as each of these timeslots is preferably a 64 kbps information channel, the high-speed bus 25 is preferably an 8.192 Mbps Time-Division-Multiplexed (TDM) bus. Preferably, the high-speed bus 25 shown in FIG. 5 is dedicated exclusively to the telephony-support module 18 and, where applicable, the redundant telephony-support module 25.

The bus multiplexer 60, which is preferably a Siemens MUSAC integrated circuit although other commercially-available multiplexers may be used, preferably switches these transmit and receive timeslots to the 6 DSPs 58. The DSPs preferably process data carried over four sub-high-speed buses 59, which each preferably carry 32 information channels or timeslots.

Each DSP 58 preferably either receives a dedicated sub-high-speed bus 59 (preferably 2.048 Mbps) from the bus multiplexer 60 or shares a sub-high-speed bus 59 with another DSP 58. Each sub-high-speed bus 59 consists of 32 transmit and 32 receive timeslots. The controller 50 preferably programs the bus multiplexer 60 and determines how the high-speed bus 25 will be switched to the DSPs 58.

In one embodiment, the first sub-high-speed bus 59 is used to carry 31 timeslots for playing of digitized voice messages. This sub-high-speed bus 59 will be connected to a zeroeth DSP ("DSP0") 58. This DSP0 preferably will use the other transmit timeslot and a receive timeslot for the Transmit and Receive FIFO function. In this embodiment, there are thirty-one other, unused, timeslots. In another embodiment, these unused timeslots could be used for either DTMF or MFR1 decoders as processing bandwidth allows for the DSP0.

The second sub-high-speed bus 59 is preferably used for a 32 channel tone generator. This sub-high-speed bus 59 is preferably connected to a first DSP ("DSP1") 58. This DSP1 preferably will use all its transmit timeslots to generate fixed tones using a table downloaded by the controller 50. In this embodiment, there are thirty-two unused receive timeslots. These timeslots could be used in other embodiments as, for example, MFR1 or DTMF decoders, depending on the processing bandwidth for the DSP 58.

The third sub-high-speed bus 59 is preferably used for a 16-channel tone generator and decoder. This sub-high-speed bus 59 is preferably shared by second DSP ("DSP2") and third DSP ("DSP3"). DSP2 will be used for MFR1 or MFR2 decoders and will be split between the second DSP ("DSP2") and the third ("DSP3"). If each DSP uses each of its sixteen channels as MFR2 decoders, all transmit and receive timeslots allocated for this DSP will be used.

The fourth sub-high-speed bus 59 will be used for MFR1 or MFR2 decoders and will be split between the fourth DSP ("DSP4") and the fifth ("DSP5"). If each DSP uses each of its sixteen channels as MFR2 decoders, all transmit and receive timeslots allocated for this DSP will be used.

The transmit timeslot utilization is the most allocated resource. This preferably allows for a maximum of 64 MFR2 decoders. While allowing many more MFR1 or DTMF decoders due to the availability of receive timeslots and some free DSP utilization on DSP0 and DSP1.

The interface between the controller 50 and each DSP 58 is preferably a two-register DMA controller, which is preferably integrated within the DSP 58. Each DSP preferably contains its own internal memory, and the integrated DMA controller allows controller 50 to read from or write to memory contained within each DSP 58. To communicate with the DSP 58, the controller 50 preferably writes an address to the DSP's 58 address port, then reads or writes data to that DSP's data port. Sections of the DSP's integrated memory are preferably partitioned within the DSP to allow the controller 50 to write commands, read the status of programs running within the DSP 58 and send/receive data to/from buffers that are controlled by individual programs running within each DSP 58.

Each DSP 58 preferably comprises a built-in, flexible, serial TDM interface that allows connectivity to either a T1-standard or E1-high-speed bus 25. The DSP 58 preferably allows selective monitoring and tri-stating of individual timeslots. To "tri-state" an individual timeslot means to place the DSP in a high-impedance state during a certain timeslot so as to effectively make the DSP 58 electrically invisible during that timeslot. This "tri-stating" feature allows multiple DSPs to share a single high-speed bus by only transmitting on certain timeslots.

Each DSP 58 preferably comprises integrated memory of at least 16K×24 bit for its program code and 16K×16 for its data memory. Making the integrated memory at least this large allows the DSP software to be optimized for speed and also allows special functions to be implemented, including a sophisticated communications interface, large FIFO structures, audio buffers to reduce interrupt processing, and statically-allocated memory stacks for multiprocessing.

The FIFO structures for instance, allow for efficient recording, playing, and saving of voice messages. These voice messages are preferably provided to notify callers of specific conditions of the telephony switching platform and can be programmed by a system administrator who calls a special number on a mobile or land line to make such a recording in the telephony-support module 18.

For recording of such voice messages, the DSP 58 sets aside some portion of its internal memory for the storage of audio. For example, the DSP might set aside 8192 words (8k) of memory. Once the voice message recording begins, the speech signal is carried to the DSP over a channel of its associated sub-high-speed bus 59. Preferably, when the DSP has recorded enough of the voice message to occupy half of the memory set aside for buffering within the DSP (4k words in this instance), the DSP will set a flag in its memory indicating that fact to the controller 50. Depending on which half of the DSP buffer memory has been filled, the controller 50 can then proceed to read the correct portion of DSP memory and store or write it to the memory 52, clearing the flag set by the DSP in the process. Once the person making the recording is satisfied with it, the controller 50 (according to instruction from that person) will transfer the speech data from memory 52 into nonvolatile memory 54.

A similar process occurs in playing voice messages from the memory 52 or nonvolatile memory 54. As data is loaded into the DSP 58 for it to play (by placing the data into the appropriate timeslot of the sub-high-speed bus 29, the DSP will set a flag once its internal speech data storage memory is half full (preferably). The controller 50 at that time will cause the data to be placed on the sub-high-speed bus 29 depending upon which half of internal DSP memory had been filled.

Each DSP 58 also comprises a two-register Internal Direct Memory Access ("IDMA") port, which allows the controller 50 to read data from and write data to each DSP 58 with minimal supervision by either the DSP 58 or the controller 50.

The DSP 58 further comprises a hardware scheme that supports autobuffering of data from the sub-high-speed bus 59, which data from the bus 59 to be stored in buffers without occurring any interrupt overhead in transferring the data to memory.

The DSP application software comprises resource modules operating under a control framework. Each resource module is designed to be reentrant, meaning that multiple copies of each resource module may be run simultaneously. Further, each resource module preferably performs a single function. For example, within the DSP application software the DTMF decoder, MFR1 transcoder, MFR2 transcoder, tone generator, receive FIFO, digitized announcement recording and playback, and Interprocessor Communications are all examples of resource modules. The control framework acts as an operating system, deciding which resource modules to run, allocating memory for those resources, collecting information to pass to the resources, and after the resource modules have completed execution, determining whether any action or state change is necessary.

The reentrant design of the DSP application resources allows the controller 50 to call upon the DSPs 58 for multiple instances of the various resources provided by the DSPs 58. Thus, if the controller 50 needs, for example, another MFR2 transcoder, the controller 50 commands the DSP 58 to activate that resource and another instance of that module is created.

Some functions such as dial tone generation and busy signal generation only involve generation of audio signals. Other functions such as MFR2 transcoding involve both generation and reception of audio signals. To make the resources as modular as possible, functions that involve both generation and reception of audio signals are preferably divided into separate modules, on for generation and one for reception/decoding. Therefore, all audio processing modules either process transmit audio or receive audio. Preferably, all audio resource modules are reentrant except for the digitized announcement functions.

In one embodiment of the invention, a unique logical identifier is assigned to each of the above-defined resources. Each of the resources is thereby assigned a timeslot 46 on the high-speed bus 25. No two resources process the same audio. A single timeslot 46 will be used, for instance, to transmit the busy signal to the switch 43. Within the telephony-support module 18, and since the maximum number of audio sources that could be processed were 32 transmits and 32 receives, 64 memory segments can be statically allocated by determining the worst case stack usage by a transmit resource and multiplying that number by 32. The same allocation can be made for the receive resources.

Since most communications are between a controller 50 and a DSP 58, instead of using a central communications routine to process each message and route it to a particular DSP, the logical identifier provides a way for the DSP 58 to create individual communications buffers for each particular resource. Thus, for the example of digit decoders, instead of the DSP 58 sending a message to the controller 50 when a digit was decoded, the control framework simply monitors the decoding resource module. When a digit is decoded, the control framework simply writes that digit to the receive buffer associated with the particular resource. This allows the controller 50 to read the digit some time later.

Preferably, there is also provided a set of status registers for each channel or logical identifier. These status registers enable the controller 50 to determine the current state of any resource on the DSP 58 at any time. Using the logical identifiers also eases control of the internal resources of the DSP. Instead of each resource module keeping track of which channel it is to process, a few simple structures allow the control framework to loop through all the active channels, determine which resources should be run, and send the proper audio buffer pointers, stack pointers, and state values to each resource since all information can be accessed using this channel key.

Therefore the interface between the control framework and any resource preferably consists of a pointer to the audio buffer, a pointer to the stack holding the current state of the resource, and various controller-configurable values. Once the resource is complete, a state is returned along with any processed information, such as decoded digits.

Further, what may appear to be one resource to the controller can be multiple internal resource modules coordinated by the control framework, like the MFR2 forward/backward transcoder. Actually, this resource is an MFR2 decoder 74 coordinated with the tone generator resource 62. If a modem were used in the telephony-support module DSP software, it would actually be many internal resources: a modem transmitter, a modem receiver, a tone generator, and a transmit and receive rate converter.

The tone generator 62 is a reentrant module that actually contains an internal dual tone generator that can be controlled in five different ways. These ways (or tone classes as they are referred to in the communications section) are determined by what kind of tone is to be generated. Class one generates continuous tones, class two generates cadenced tones, class three generates a series of DTMF digits, class four generates a series of MFR1 digits, and class five generates a series of preprogrammed tones. The resource is passed a pointer to the stack, a pointer to the transmit audio buffer to be filled, the number of active transmit channels, and the duration of audio to be processed. The resource 62 returns a state flag indicating whether the tone generation has been completed. Classes one and two are continuous and do not complete. In the other classes, the state flag is returned from the resource indicating when the resource has completed generating the sequence.

The DTMF/MFR1/MFR2 forward/MFR2 backward decoder are reentrant resource modules. MFR2 forward and MFR2 backward are designated in the drawing and discussed herein as a single module; preferably these will be implemented as separate modules but they could be accomplished in either fashion. Although these resource modules are physically different modules, the interfaces to these modules 66, 70, 74 are preferably identical. All these resource modules preferably decode dual tones, but each has different specifications for the frequency, duration, audio quality, and filtering. These resources are passed a pointer to the stack, a pointer to the receive audio buffer to be filled, the number of active receive channels, and the duration of audio to be processed. The resource returns a digit if one has been decoded and validated, otherwise it returns a zero value is returned for MFR2 and a negative 1 for MFRL and DTMF.

The audio storage resource 78 preferably monitors audio and stores audio in a small circular buffer. When audio is detected, the contents of the buffer is stored at the beginning of one FIFO and the additional audio is stored afterwards. When one FIFO is filled, the resource 78 begins storing audio in another FIFO. The resource is passed a pointer to the receive audio buffer to be processed and the number of active receive channels. The resource module returns a value indicating if FIFO 1 or FIFO 2 has been filled. This function is preferably not a reentrant module, meaning that preferably no more than one instance of this module can be run at the same time.

The audio playback resource 82 plays audio from one FIFO until it is empty, then begins playing audio from another. The resource 82 is passed a pointer to the receive audio buffer to be processed and the number of active receive channels. The resource module returns a value indicating if FIFO 1 or FIFO 2 has been emptied. Like the audio storage resource 78, audio playback resource 82 is preferably not a reentrant module.

The control framework handles some of the functions of an operating system including allocating memory, scheduling and prioritizing tasks, and interfacing to low level driver software. The control framework consists of a startup routine and one main loop that cycles through active transmit and receive channels. Inside the loop, the framework tests whether any transmit or receive resources are active for the current channel. If a resource is active, the state of that resource is determined, information for that resource/channel combination is calculated and passed and the resource is executed. Once the resource has completed processing, the return values are used to determine any state changes or necessary actions to be taken. For example, if a tone generator returns that it has completed the assigned generation, several events occur: the status buffer is set to indicate that the transmit is complete, the resource is stopped from running (it is not deactivated), and the transmit stack and transmit communication buffer for that channel is cleared.

Once all active channels have been processed, the applications software has completed processing. The control framework then returns control to the driver software, which determines whether audio is ready to be processed. If audio is not ready, the driver software activates a communications routine which processes commands from the controller 50.

The startup routine in the control framework takes care of the following tasks: all transmit audio buffers are cleared, the command string is validated and processed if a command has been written by the controller 50, and the timer subroutine is run. The timer subroutine takes care of any control functions that need a time-out such as the DTMF and MFRL decoders 66, 70. After a certain duration has passed and no digits have been detected, the timer routines expire and a bit is set in the status register for that channel indicating that the reception is complete and that the buffer can be read.

The DSP communications interface 92 is based on a buffer system, since the controller 50 can directly access DSP memory. The controller 50 sends commands to the DSP command buffer and any transmit data is written to the communications transmit buffers. When an action occurs within the DSP it is reflected in the status buffer and any receive information detected by the DSP 58 is reported. Using buffers allows the controller 50 to treat the resource modules as intelligent distributed hardware devices rather than having all communications pass through a control process within the DSP 58.

DSPs on the telephony-interface module 18 will have a separate IDMA port mapped to the I/O of the controller 50.

To communicate with the DSP, the controller 50 reads and writes to several buffers. A difficulty arises when with new revision of DSP software, the location of these buffers can change dramatically. The solution to this problem was to create a statically-located buffer containing the location of the other buffers and a static map to tell where each pointer is located in the static buffer. This static buffer is called the pointer buffer 94. In one embodiment, the pointer buffer is statically located at a certain IDMA address at the beginning of data memory. A map can then be defined with addresses relative to the pointer buffer 94, and these addresses for the various transmit and receive buffers can be converted to their IDMA addresses by adding the certain IDMA address to each of the relative addresses.

For example, the addresses given below are data memory addresses. Assuming the certain IDMA address for the static pointer buffer is at 0x4000, addresses may be converted to IDMA addresses by adding 0x4000 to each address.

| Address | Buffer Pointer | | | Address | Buffer Pointer | | |
|---|---|---|---|---|---|---|---|
| 0 × 0000 | Status | Buffer | Pointer | 0 × 0001 | Command | Buffer | Pointer |
| 0 × 0002 | Channel Buffer | 1 | Transmit | 0 × 0003 | Channel Buffer | 1 | Receive |
| 0 × 0004 | Channel Buffer | 2 | Transmit | 0 × 0005 | Channel Buffer | 2 | Receive |
| 0 × 0006 | Channel Buffer | 3 | Transmit | 0 × 0007 | Channel Buffer | 3 | Receive |
| 0 × 0008 | Channel Buffer | 4 | Transmit | 0 × 0009 | Channel Buffer | 4 | Receive |
| 0 × 000A | Channel Buffer | 5 | Transmit | 0 × 000B | Channel Buffer | 5 | Receive |
| 0 × 000C | Channel Buffer | 6 | Transmit | 0 × 000D | Channel Buffer | 6 | Receive |
| . . . | . . . | | | . . . | . . . | | |
| . . . | . . . | | | . . . | . . . | | |
| . . . | . . . | | | . . . | . . . | | |

There are five type of buffers utilized in the communications interface: command, communications, FIFO, pointer, and status. The command buffer is used to send command from the controller 50 to the DSP 58. The communications buffers are accessed to send data to and receive data from resources running on particular channels or timeslots. The FIFO buffers are used to buffer audio between the sub-high-speed bus 59 and the controller memory 52 or voice message memory 57 for the digitized announcement functions. The pointer buffer is absolutely located at a certain, IDMA address (0x4000) and contains the location of all other buffers. The status buffer contains the run-time status of the various resources.

The controller 50 uses the IDMA port of each DSP for communications. The IDMA (Internal Direct Memory Access) port 88 consists of two registers: an address register and a data register. In order to read information from the DSP 58, the controller 50 writes an address to the address register, then reads from the data register. In order to write information to the DSP 58, the controller 50 writes an address to the address register, then writes to the data register. If the read or write operation is working on consecutive data access, like reading or writing a buffer, only the first address needs to be written. After the first data access, the address can be automatically incremented. Preferably, all In addition to communicating with the DSPs 58, the controller 50 also effects communication with the switching module 16 through the LCOM controller 56. A unique protocol has been adapted for communications among the switching module 16 and the resource processors 18,20,22 over the control bus 24. The LCOM protocol has driver software that is compiled to run on the controller for the switching module 16, as well as the controllers for the resource processors 18,20,22. The LCOM protocol also has an applications layer or applications software, which operates at the higher level above the driver software.

Figure 8:
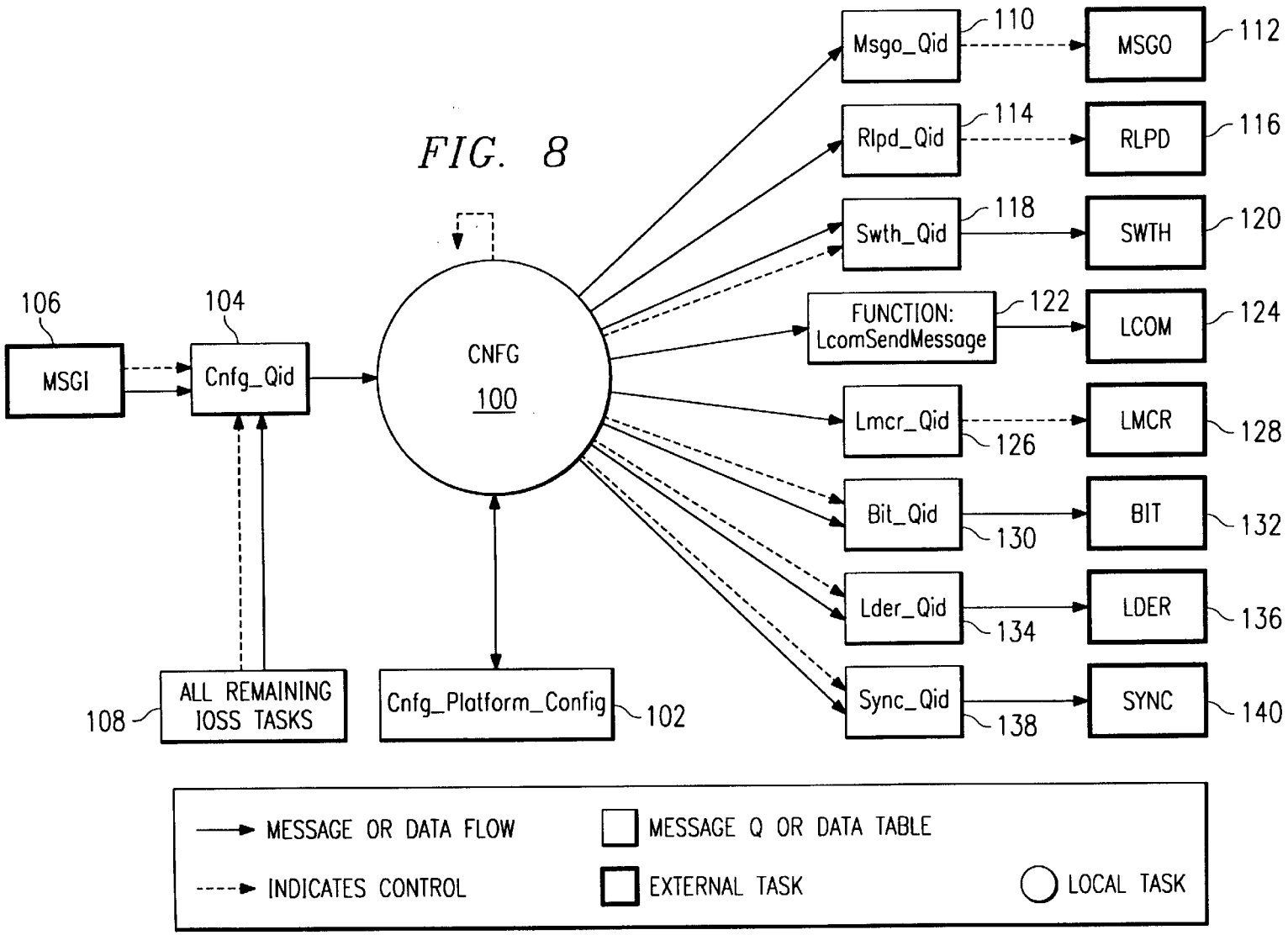
FIG. 8 is a task flow diagram of the steps taken by the telecommunications switching platform upon startup.

Preferably, the LCOM driver code is cross compiled to the controllers for the resource processors 18,20,22 and the switching module 16. The LCOM driver is capable of managing the redundant control buses 24, which are preferably two ESCC 2 synchronous serial buses operating at up to 256 Mbps each. The LCOM driver comprises an interrupt service routine and receive and transmit queues. Referring to FIG. 8, the LCOM driver in the switching module 16 utilizes two tasks, LCOM 124 and LCMR, to provide routing to and from the driver software.

The driver transmits and receives one message per frame. In one embodiment, the message has the following format:

| LCOM_HEADER - 4 BYTES | | | |
|---|---|---|---|
| PROCESSOR ID | PROCESS ID | LENGTH | MSG |
| UINT1 | UINT1 | UINT2 | any type |

The first four bytes of the message is the LCOM_HEADER, which is available only to the LCOM software.

On the switching modules 16 and resource processors 18,20,22, there are preferably two transmit queues, one for each transmit bus 24. A message is placed in a transmit queue with a LcomSendMessage call 122. LcomSendMessage 122 has the following format:

```
UINT1 LcomSendMessage (UINT1 processor_id, UINT1 process id,
UINT2 length, void FAR *msg)
```

The "processor_id" field is the slot id of the desired destination board. The slot id is simply the slot in which the desired destination board is located. There are two exceptions to using the slot id: BID_SDM is used in place of the slot id to send to the switching module 16; BID_PSM is used in place of the slot id to send to the on-line telephony-support module 18.

The "process_id" field preferably identifies either a task on the switching module 16, such as the tasks 112, 116, 120, 124, 128, 132, 136, 140 or a pseudo-task on the resource processors 18,20,22.

The "length" field is the length of the raw message. This length does not include the length of the LCOM_HEADER, which is preferably four bytes.

The "msg" field is any data of any data type, although the message's length is preferably limited by a constant known to the software.

On the switching module 16, there is preferably no prerequisite to calling LcomSendMessage 122, but on the resource processors another function, NewMessage, is called before LcomSendMessage. NewMessage allocates a queue link. This queue link is then added to the transmit queue when LcomSendMessage is called.

In the OFFLINE switching module 16 (in embodiments having redundant switching modules 16), the message is discarded and is not added to the transmit queue.

The type of message preferably determines which queue the message is placed in. On the resource processors 18,20, 22, if the message is a normal traffic message, it is placed in the queue that serves the primary bus 24. If it is an LCOM application message, the message is placed on either a primary or a secondary bus 24. On the switching module 16, if the message is a normal traffic message, the Heartbeat Table determines in which queue the message is placed. If it is an LCOM application message, the message may be placed on either of the buses.

On the resource processor boards 18,20,22, the queues are repeatedly checked for messages to be transmitted. If a message is ready, and the corresponding driver transmit buffer is ready, the message is taken off the queue and placed in the driver transmit buffer.

On the switching module 16, when a new message is added to a transmit queue, an event wakes up the LCOM task 124. Messages are taken from the transmit queues until the queues are empty. Each message waits for the appropriate transmit buffer to become available before it is placed in the driver transmit buffer.

For either the switching module 16 or any of the resource processors 18,20,22, once a message is placed into the driver transmit buffer, a first group of bytes, preferably thirty-two, are moved to the LCOM Controller's 56 transmit FIFO. This controller is shown on the telephony-support module block diagram, FIG. 5, but analogous controllers preferably exist on each of the switching modules 16 and resource processors 18, 20, 22 for interfacing with the redundant control buses 24.

When another group of bytes are transmitted by the LCOM controller 56, an interrupt is generated, and another group of bytes are moved to the LCOM Controller's 56 transmit FIFO. This continues until the entire message is sent. The message is preferably sent in constant-size groups of thirty-two in this embodiment. Even the last group is preferably the same size as the other groups. For this reason, the transmit buffer size of the LCOM driver is preferably divisible by the size of each group of bytes. If there is a transmission error and the error is recoverable, the buffer index is reset, the message is moved to the LCOM Controller's 56 transmit FIFO, and the transmission process is repeated.

As with transmission, messages are received by the LCOM Controller 56 in constant-size groups of bytes, so the receive buffer size of the driver is preferably divisible by thirty-two. As each block is received, an interrupt is generated, and the group of bytes are moved from the LCOM Controller 56 receive FIFO to the LCOM driver receive buffer. This continues until the entire message is received. Then the message is added to the receive queue. If there is a reception error, and the error is recoverable, the buffer index is reset, and reception occurs at the beginning of the message. If an error occurs which is not recoverable, this means that a message has been lost, and an error flag is set which eventually will cause an alarm.

On the resource processors 18,20,22, the receive queue is repeatedly checked for received messages. If one is available, it is taken from the queue and sent to a message distributor. The distributor routes the message based on only the process_id, which is the second byte of the LCOM_HEADER in this embodiment. The distributor uses the process_id to reference a table of function pointers. The referenced function is then called with the same parameters of LcomSendMessage 122. The following defines the interface of all resource processor message functions:

```
function ( UINT1 processor, UINT1 process_id, UINT2
length, void FAR *msg);
```

On the switching module 16, when a new message is added to the receive queue, an event wakes up the LCMR task. Messages are taken from the receive queue until the queue is empty. Each message is copied to the appropriate operating system queue based on the process_id of the message.

The LCOM software also exists at the applications layer. The software at this level comprises the following functions: "hot" resource processor 18,20,22 board insertion detection; individual resource processor 18,20,22 bus failure detection and recovery; individual resource processor 18,20,22 failure detection (including "hot" resource processor 18,20,22 board removal detection); and OFFLINE switching module 16 bus failure detection. These functions are implemented with the following mechanisms: Primary Heartbeat Messaging; Secondary Heartbeat Messaging; and OFFLINE Heartbeat Response Reception.

Primary Heartbeat Messaging occurs on the primary bus 24 of each resource processor 18,20,22. In this embodiment, the primary bus 24 is the bus 24 on which the resource processor is currently transmitting application messages. All bus traffic except for Secondary Heartbeat Messaging occurs on the primary bus 24. The primary bus 24 of a resource processor 18,20,22 is determined only by its broadcast address. If its broadcast address is LCOM_BROADCAST_ADDRESS_A, then its primary bus is Bus A. If its broadcast address is LCOM_BROADCAST_ADDRESS_B, then its primary bus is Bus B.

The switching module 16 uses these broadcast addresses to broadcast heartbeat messages to either all boards with primary bus A or all boards with primary bus B. The primary bus 24 only has meaning for the resource processors 18,20,22; therefore, the switching module 16 does not have a primary bus. It transmits application messages on both buses 24. Primary heartbeat messaging is used to detect hot board insertion, primary bus failure, and board failure.

Secondary heartbeat messaging occurs on the secondary bus 24 of each resource processor 18,20,22. In this embodiment, the secondary bus 24 is the bus other than the primary bus 24. Secondary heartbeat messaging is used to detect secondary bus 24 failure.

OFFLINE heartbeat response reception is not active. The OFFLINE switching module 16 does not transmit on either the primary or secondary buses 24. The switching module 16 simply receives the same resource processor 18,20,22 responses that the ONLINE switching module 16 does. The OFFLINE heartbeat response reception is used to detect OFFLINE switching module 16 bus failure.

These functions and mechanisms are implemented with software on the resource processors 18,20,22 and the switching module 16. The switching module 16 application software consists of the LCOM heartbeat task (LCMH) and the Heartbeat_Table. The Heartbeat Table retains the state of each slot of the IOSS platform 27. Specifically, the Heartbeat_Table maintains status as to: whether each slot responds to a heartbeat poll; which bus 24 is used by each slot in its heartbeat response; and which bus 24 is the current transmission bus 24 for each slot.

The LCOM application software for the resource processors 18,20,22 consists of two message functions, which handle all LCOM heartbeat messages: Primary Heartbeat Messaging and Secondary Heartbeat Messaging.

Figure 9:
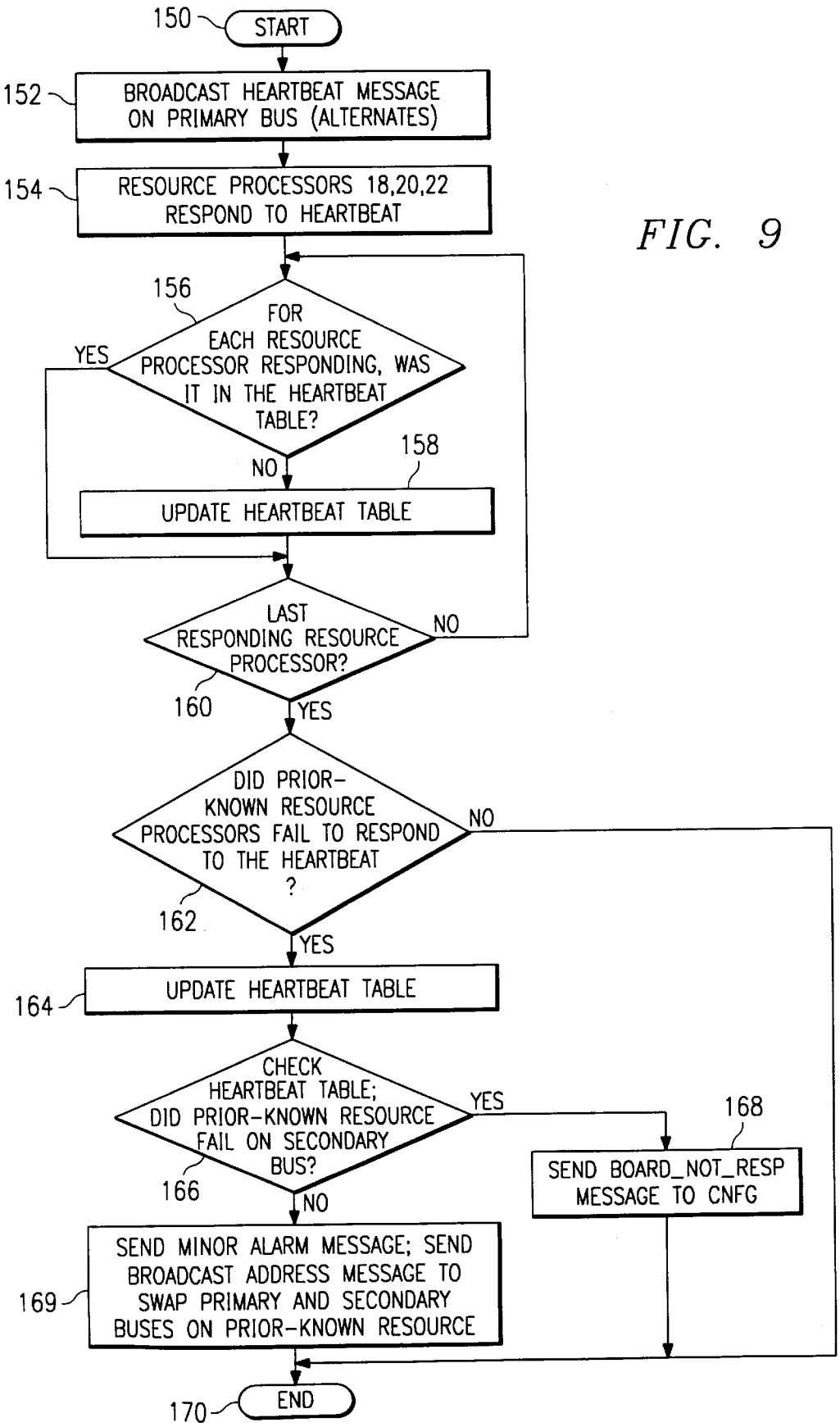
FIG. 9 is a flow diagram of Primary Heartbeat Messaging function.

Primary Heartbeat Messaging. Referring now to FIG. 9, Primary heartbeat messaging is the ONLINE switching module's 16 mechanism for detecting and responding to hot insertions, hot removals, and primary LCOM bus 24 failures. "Hot" insertions and removals refer to insertions and removals that are performed when the switching platform 10 is powered-on and operating.

A Heartbeat Table is provided on the switching module 16 to monitor the status of the various resources in the telecommunications switching platform. The Heartbeat Table is kept at a lower applications level in the system than is the Configuration Table, and these tables are preferably separate. Other embodiments are, however, possible in the present invention; specifically, the status information could be maintained in real-time in the configuration table, and the below-mentioned updates to the Heartbeat Table could be made instead to the Configuration Table.

Periodically, at step 152, the switching module 16 broadcasts a heartbeat message on both control buses 24. Each resource processor 18,20,22 responds at step 154 to the broadcasted message received on its primary bus 24. For each resource processor 18,20,22 that responds to a primary heartbeat message, the Heartbeat Table is checked at step 156 to determine if the resource processor 18,20,22 was previously registered therein. This is done for each responding RP, as can be seen by decision block 160. If a newly inserted resource processor 18,20,22 responds to the broadcasted message, the switching module 16 registers this slot as a hot insertion at step 158. If an existing resource processor 18,20,22 fails to respond (at step 162), in the next heartbeat cycle the switching module 16 board tries transmitting a Heartbeat Message over the secondary bus 24. If the resource processor still fails to respond over the secondary bus 24, according to the test at step 166, then the switching module 16 registers either a hot removal or a board failure for that resource processor 18,20,22 at step 168. The switching module 16 makes this registration by removing the resource processor 18,20,22 from the Heartbeat Table and updating the Cnfg-Platform Cnfg table 102 (see FIG. 8).

Still referring to FIG. 9, more detailed embodiments will be discussed below. In one embodiment, at step 152, the LCMH task clears the response number and response bus fields of the Heartbeat Table and broadcasts the heartbeat message on both buses 24 in an alternating fashion. In other words, the LCMH will transmit a heartbeat message first over one of the buses (Bus A) and then will transmit a heartbeat message on the other bus (Bus B). Bus A may be a primary bus for some resource processors 18,20,22 and may be a secondary bus for the others. Bus B may be a primary bus for those buses for which Bus A was the secondary bus and may be a secondary bus for the others. The LCMH task sends the broadcast heartbeat message, which is preferably of the following format:

| PROCESSOR ID | PROCESS ID | LENGTH | BUS_ID |
|---|---|---|---|
| UINT1 Either BROADCAST_ADDR_A or BROADCAST_ADDR_B | UINT1 PID_LCOM_ HEARTBEAT | UINT2 0 × 0001 | UINT1 ESCC2_ BUSA Or ESCC2_ BUSB |

BROADCAST_ADDR_A is used for broadcasting to those resource processors 18,20,22 that have Bus A as their primary bus 24. BROADCAST_ADDR_B is used for broadcasting to those resource processors 18,20,22 that have bus B as their primary bus 24. The Bus_Id corresponds to the primary bus 24 of the resource processor 18,20,22.

Each resource processor 18,20,22 is preferably configured to receive a broadcast heartbeat message on its primary bus 24, so each resource processor 18,20,22 receives and responds at step 154 to only one of the broadcasted heartbeats. Upon reception, a message distributor within the resource processor 18,20,22 sends it to the PidCmnLcomHeartbeat message function. This message function performs actions depending on the resource processor 18,20,22 state and then responds at step 154 to the switching module 16 by sending a heartbeat response message on its primary bus 24. An exemplary format for the heartbeat response message is defined below:

| PROCESSOR ID | PROCESS ID | LENGTH | LCOM MESSAGE TYPE | SLOT ID | BUS_ID |
|---|---|---|---|---|---|
| UINT1 BID_ | UINT1 LCMH_ | UINT2 0 × 0003 | UINT1 0 × 01 | UINT1 Slot ID | UINT1 ESCC2_BUSA |

-continued

| PROCESSOR ID | PROCESS ID | LENGTH | LCOM MESSAGE TYPE | SLOT ID | BUS_ID |
|---|---|---|---|---|---|
| SDM | ID | | | of the resource processor 18, 20, 22 | or ESCC2_BUSB |

The LCMH_ID is the process_id of the LCMH_ID task. The Bus_Id represents the primary bus 24 of the resource processor 18,20,22.

When the switching module 16 receives a heartbeat response message from a resource processor 18,20,22, it is distributed to the LCMH task, which at step 158 updates the Heartbeat Table for that particular resource processor 18,20,22. The Heartbeat Table is updated to indicate the new valid response count and the new bus 24 on which the response was received.

After one second has elapsed since the broadcast, the LCMH task updates the Heartbeat Table state fields based on the responses collected in the response number and response bus fields of the Heartbeat Table. The LCMH task then performs actions based on the state of each resource processor 18,20,22 in the Heartbeat Table.

The following sections describe how the heartbeat mechanism detects hot insertions, hot removals, and primary LCOM bus 24 failures.

Hot Insertions. The following method for detecting hot insertions accounts for the switching module 16 or the resource processor 18,20,22 powering up first, and allows for new resource processors 18,20,22 to attempt connection on both buses 24 in case the board has only one good bus 24. Also, this method eliminates the need for CNFG task to ping all slots at startup. The CNFG task is described in greater detail in U.S. patent application No. 09/026,486 (Docket No. 24194000.196), entitled "System and Method for Forming Circuit Connections within a Telecommunications Switching Platform," filed on Feb. 19, 1998, which is incorporated by reference herein.

When a resource processor 18,20,22 has finished booting and initializing, it goes into registration mode. In an attempt to balance the message load, the board initially sets its broadcast address and primary bus 24 based on its slot number. In one embodiment, if a resource processor 18,20,22 is located on a telecommunications rack slot having an odd slot number, its initial primary bus 24 will be Bus B. If it is in a slot having an even slot number, its initial primary bus 24 will be Bus A. This helps in load sharing and reducing the number of collisions on the control buses 24.

Although the buses 24 are preferably wired-OR buses, upon which collisions are possible, the buses 24 may be other types of buses or the resource processors 18,20,22 might be connected to each other using local area network connections. In any case, even if collisions cannot happen on the buses 24, the load-sharing by division of resource processors 18,20,22 between two communications media is still advantageous in balancing the traffic load therebetween.

The switching module 16 receives the heartbeat response, and after one second has elapsed since sending the heartbeat message, updates the Heartbeat Table to indicate that the new board is ON-LINE. And then sends a PID_CHANGE_BROADCAST_ADDR message to the resource processor 18,20,22 (note this message is mainly used to swap broadcast addresses). The PID_CHANGE_BROADCAST_ADDR message has the following format:

| PROCESSOR ID | PROCESS ID | LENGTH | BUS_ID |
|---|---|---|---|
| UINT1 Slot ID of the resource processor 18, 20, 22 | UINT1 PID_CHANGE_BROADCAST_ADDR | UINT2 0 × 0001 | UINT1 either ESCC2_BUSA or ESCC2_BUSB |

When the resource processor 18,20,22 receives the PID_CHANGE_BROADCAST_ADDR message, it leaves registration mode, and goes into normal operation mode. The resource processor 18,20,22 is then able to transmit all messages.

If the resource processor 18,20,22 does not receive a heartbeat message from the switching module 16, the transmission bus 24 and broadcast address are changed to the other bus 24. If there is no heartbeat message within a second time period, the transmission bus 24 and broadcast address are changed back to the original bus 24, and so on. This bus switching allows the resource processor 18,20,22 to attempt connection on both buses 24 in case one is bad.

Bus and Board Failure Detection. The following bus failure detection method detects individual resource processor 18,20,22 primary bus 24 failure within one time period and individual resource processor 18,20,22 failure within two time periods. A time period is preferably one second, but of course, these time periods can be shortened to any desired time period by increasing the rate of the heartbeat messages from the switching module 16. In one embodiment, the LCOM protocol only assumes board failure, but cannot determine between resource processor board 18,20,22 failure and hot removal.

Thus, when a resource processor 18,20,22 stops responding on both buses according to the test at step 16, LCOM sends CNFG a BOARD_NOT_RESP message at step 168. CNFG must determine if a board has failed or has been removed based on the ONLINE or OFFLINE state of the resource processor 18,20,22.

If the switching module 16 receives responses from all existing resource processors 18,20,22 within a first period, it proceeds assuming that all is well at step 170. But if the switching module 16 does not receive a response from an already-existing resource processor 18,20,22, the switching module 16 assumes that, at the least, that the unresponsive resource processor 18,20,22 has a bad transmit or receive bus driver of its primary bus 24. The Heartbeat Table is updated accordingly at step 164. If the secondary bus 24 is also known bad, a BOARD_NOT_RESP is sent to CNFG at step 168 since no communication with the resource processor 18,20,22 is possible. If the secondary bus 24 is known to be good, the process proceeds to step 169. At step 169, a minor alarm message is sent to the CNFG task on the switching module 16. Also at step 169, a set broadcast address message is sent from the switching module 16 to the unresponsive resource processor 18,20,22 on the secondary bus 24 so that resource processor is communicated with over its secondary bus 24.

If the resource processor 18,20,22 receives the set broadcast address command, the Change Broadcast Address message function will set the broadcast address according to the Bus_Id field of the message. This also swaps the primary and secondary bus 24 (and queue) so that the new primary bus 24 is the old secondary bus 24, and the new secondary bus 24 is the old primary bus 24. This will allow the resource processor 18,20,22 to receive and respond to heartbeats on the known good bus 24.

In cases when the resource processor 18,20,22 is not able to respond to heartbeat messages within the prescribed heartbeat period, preferably one second, the LcomStopResponding function is called. This puts the resource processor 18,20,22 back in registration mode, and sends an LCOM stop responding message to the switching module 16. This tells the switching module 16 to ignore any unresponsiveness of a board. In other words, if the switching module 16 does not get a heartbeat response from the resource processor 18,20,22, no alarms are sent to the CNFG task. The LCOM stop responding message has the following format:

| PROCESSOR ID | PROCESS ID | LENGTH | LCOM MESSAGE TYPE | SLOT ID |
|---|---|---|---|---|
| UINT1 BID_SDM | UINT1 LCMH_ID | UINT2 0 × 0003 | UINT1 0 × 02 | UINT1 Slot ID of the resource processor 18, 20, 22 |

Once the unresponsive state has been reached, the switching module 16 behaves as if the resource processor 18,20,22 is not present. Then, when the resource processor 18,20,22 receives and processes an LCOM heartbeat, the resource processor and the switching module 16 behave as if the resource processor 18,20,22 was a hot insertion.

Figure 10:
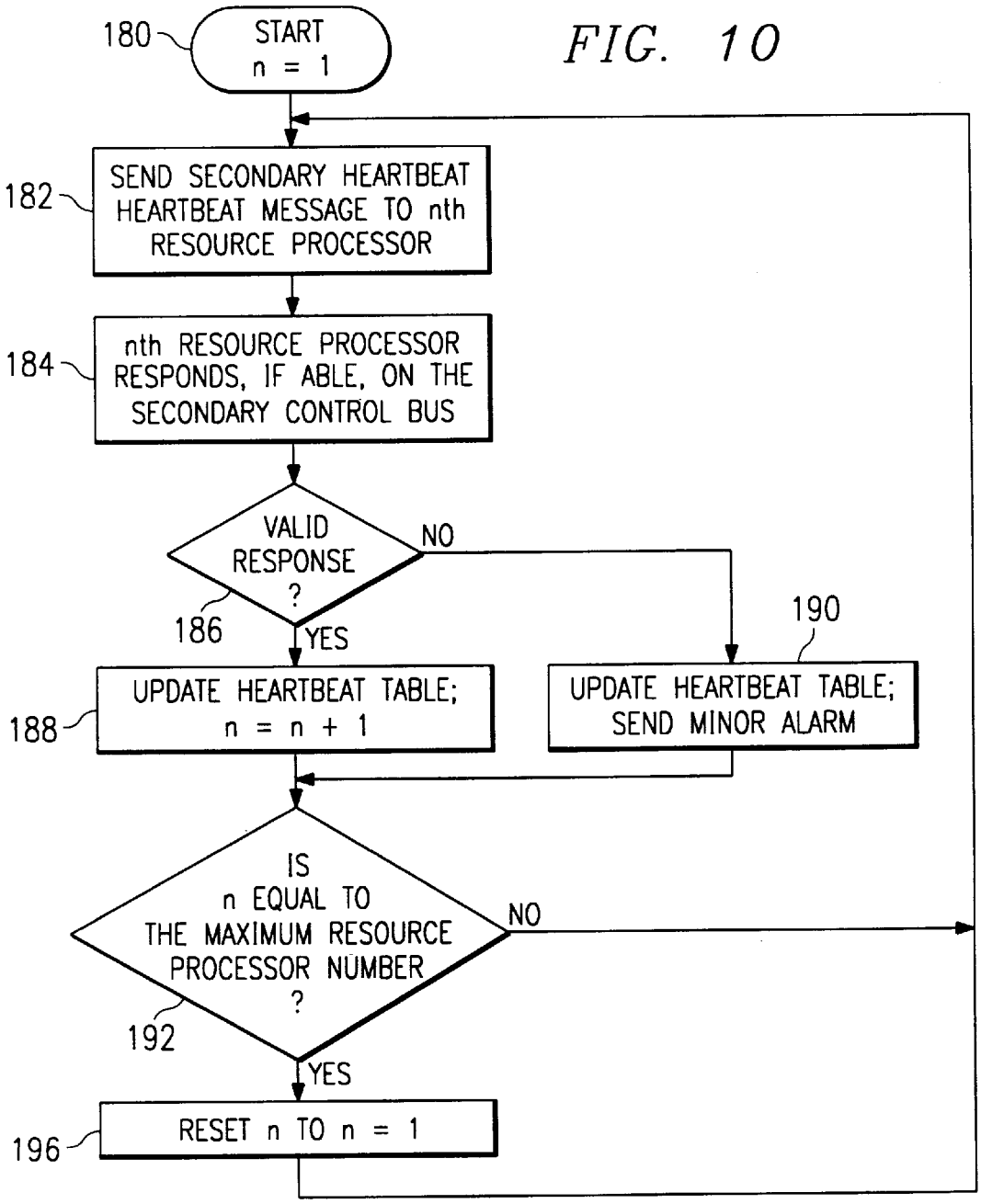
FIG. 10 is a flow diagram of the Secondary Heartbeat Messaging function.

Secondary Heartbeat Messaging. Referring now to FIG. 10, secondary heartbeat messaging is the ONLINE switching module 16 mechanism for detecting a bad secondary bus 24 on a resource processor 18,20,22. This mechanism is important so CNFG can be warned that the secondary bus 24 is bad, so no attempt is made to use this as a primary bus 24. Instead, an operator can then force the suspect board into OFFLINE mode and replace it with another without losing any messages. The secondary bus 24 failure method detects bus failure of secondary buses 24, preferably within twenty heartbeat periods in an embodiment where twenty resource processors 18,20,22 exist on the IOSS platform 27.

During each heartbeat period, the switching module 16 sends a secondary heartbeat message at step 182. This heartbeat message is in addition to the primary heartbeat message, but it is only addressed for one registered resource processor 18,20,22. In one embodiment, the secondary heartbeat message is always sent on the secondary bus 24. Preferably, the secondary heartbeat message has the same format as the primary heartbeat message, which was described above.

At step 184, the resource processor 18,20,22 responds to the secondary heartbeat message the same way it responds to a primary heartbeat message, but it responds on the secondary bus 24. In this embodiment, this is the only message that is sent on the secondary bus 24 from a resource processor 18,20,22. The format of the secondary heartbeat response message is preferably the same as the format of the primary heartbeat response described above.

The switching module 16 preferably responds to the secondary heartbeat response message the same way it responds to a primary heartbeat response message. When the switching module 16 receives a valid heartbeat response message from a resource processor 18,20,22 according to the test step 186, it is distributed to the LCMH task, which updates the Heartbeat Table. The Heartbeat Table is updated at step 188 to indicate the new valid response count and the new bus 24 on which the response was received.

If, after the heartbeat period elapses, the switching module 16 does not receive a response from the resource processor 18,20,22, it is assumed that the unresponsive resource processor 18,20,22 has, at the least, either bad transmit or receive bus 24 driver on its secondary bus 24. Then, at step 190, the Heartbeat Table is updated accordingly and a minor alarm message is sent to CNFG, since communication with the resource processor 18,20,22 is still possible on the primary bus 24.

According to step 192, each period, a different registered resource processor 18,20,22 is addressed until they all have been addressed. When a secondary heartbeat message has been sent to all registered boards, the cycle starts over.

OFFLINE Heartbeat Response Reception. OFFLINE heartbeat response reception is the OFFLINE switching module 16 mechanism for detecting a bad bus 24 on the OFFLINE switching module 16. This mechanism is important so the CNFG task can be warned that a OFFLINE switching module 16 bus is bad, so it will never attempt to use it. The switching module 16 board can then be replaced by an operator without losing any messages. OFFLINE heartbeat response reception allows detection of OFFLINE switching module 16 bus error, preferably within twenty seconds. The OFFLINE Heartbeat Response Reception is also a passive mechanism. No messages are sent to resource processors 18,20,22 from the OFFLINE switching module 16. Instead, the OFFLINE switching module 16 utilizes the resource processors 18,20,22 responses to the ONLINE switching module 16 to determine bus status.

Preferably, within twenty heartbeat periods, the OFFLINE switching module 16 should receive twenty complete sets of primary heartbeat response messages and one or more sets of secondary heartbeat response messages. When the OFFLINE switching module 16 receives a heartbeat response, it is distributed to the LCMH task, which updates the Heartbeat Table.

After the preferred twenty heartbeat periods, the Heartbeat Table is checked. If the table indicates at least one reception of a heartbeat response on bus A and bus B, all is well. The OFFLINE heartbeat response reception begins another cycle, but if the table indicates no receptions on a particular bus 24, then that bus is assumed bad. A warning alarm is sent to the CNFG task to inform it of the bad bus 24.

Heartbeat Table Operation; ONLINE Switching Module 16 Operation. When the switching module 16 becomes ONLINE, if either bus 24 is known bad, the switching module 16 will send a set broadcast address message to all boards using the good bus 24. The set broadcast address message is defined above. This ensures that each resource processor 18,20,22 uses the only good bus as its primary bus 24.

Next all response number fields of the Heartbeat Table are initialized to LCOM_NO_CARD. As responses start coming in, the state will change to indicate the primary bus 24 of each board.

After initialization, the LCMH task periodically resets the Heartbeat Table response number fields to zero and the Heartbeat Table response bus fields to ESCC2_NO_BUS for each resource processor 18,20,22. When a valid heartbeat response message is received from a resource processor 18,20,22, the Heartbeat Table response number field for that board is incremented, indicating a valid reception. The Heartbeat Table bus response field is also updated according to the bus 24 on which the heartbeat response message is received.

The Heartbeat Table state field is updated according to the values of the Heartbeat Table response number and response bus fields.

The Heartbeat State Table holds the heart beat state value for each slot of the system. There are dynamic states which are transient states having a duration of one period and there are static states changing only upon certain events. The following lists possible static and dynamic heartbeat states and descriptions:

| STATIC HEARTBEAT STATE | DESCRIPTION |
|---|---|
| LCOM_FIRST_A | A is primary bus, B is good |
| LCOM_FIRST_B | B is primary bus, A is good |
| LCOM_SECOND_A_P | A is primary bus, B is bad due to primary bus failure |
| LCOM_SECOND_B_P | B is primary bus, A is bad due to primary bus failure |
| LCOM_SECOND_A_S | A is primary bus, B is bad due to secondary bus failure |
| LCOM_SECOND_B_S | B is primary bus, A is bad due to secondary bus failure |
| LCOM_NO_CARD | No card is connected in this slot (Initialized to this at boot) |

| DYNAMIC HEARTBEAT STATE | DESCRIPTION |
|---|---|
| LCOM_GOTO_SECOND_A_P | A becomes primary bus because no response on previous primary bus B. Sends Alarm |
| LCOM_GOTO_SECOND_B_P | B becomes primary bus because no response on previous primary bus A. Sends Alarm |
| LCOM_GOTO_SECOND_A_S | A remains primary bus, but detected secondary bus failure on B. Sends Alarm. |

-continued

| | |
|---|---|
| LCOM_GOTO_SECOND_B_S | B remains primary bus, but detected secondary bus failure on A. Sends Alarm |
| LCOM_GOTO_FIRST_A_P | A remains primary bus, but bus B which previously had a bus A primary failure is now working. Send clear Alarm |
| LCOM_GOTO_FIRST_B_P | B remains primary bus, but bus A which previously had a bus A primary failure is now working. Send clear Alarm |
| LCOM_GOTO_FIRST_A_S | A remains primary bus, but bus A which previously had a bus B secondary failure is now working. Send clear Alarm |
| LCOM_GOTO_FIRST_B_S | A remains primary bus, but bus A which previously had a bus B secondary failure is now working. Send clear Alarm |
| LCOM_FAILING | Failing because of no response on A or B. Sends BOARD_NOT_RESP. |
| LCOM_GOTO_FIRST | Received first response from card since boot |

Each slot of the Heartbeat Table state field is preferably updated every heartbeat period. The following events within the heartbeat period induce a change: reception of a Primary Heartbeat Response Message; reception of a Secondary Heartbeat Response Message; no reception of Primary Heartbeat Response Message; and no reception of a Secondary Heartbeat Response Message.

The following state table shows the next state that results from an event occurring during the current state.

| CURRENT STATE | PRIMARY HEARTBEAT RECEPTION | NO PRIMARY HEARTBEAT RECEPTION | SECONDARY HEARTBEAT RECEPTION | NO SECONDARY HEARTBEAT RECEPTION |
|---|---|---|---|---|
| FIRST_A | FIRST_A | GOTO_SECOND_B_P | FIRST_A | GOTO_SECOND_A_S |
| FIRST_B | FIRST_B | GOTO_SECOND_A_P | FIRST_B | GOTO_SECOND_B_S |
| SECOND_A_P | SECOND_A_P | FAILING | GOTO_FIRST_A_P | SECOND_A_P |
| SECOND_B_P | SECOND_B_P | FAILING | GOTO_FIRST_B_P | SECOND_B_P |
| SECOND_A_S | SECOND_A_S | FAILING | GOTO_FIRST_A_S | SECOND_A_S |
| SECOND_B_S | SECOND_B_S | FAILING | GOTO_FIRST_B_S | SECOND_B_S |
| NO_CARD | GOTO_FIRST | NO_CARD | NO_CARD | NO_CARD |

The following states cause the following responses, and preferably immediately advance to another state:

| CURRENT STATE | RESPONSE | NEXT STATE |
|---|---|---|
| GOTO_SECOND_B_P | Send an alarm to CNFG that bus A has a primary failure, and send a set broadcast address message to the resource processor 18, 20, 22. | SECOND_B_P |
| GOTO_SECOND_A_P | Send an alarm to CNFG that bus B has a primary failure, and send a set broadcast address message to the resource processor 18, 20, 22. | SECOND_A_P |

-continued

| CURRENT STATE | RESPONSE | NEXT STATE |
|---|---|---|
| GOTO_SECOND_B_S | Send an alarm to CNFG that bus A has a secondary failure. | SECOND_B_S |
| GOTO_SECOND_A_P | Send an alarm to CNFG that bus B has a secondary failure. | SECOND_A_S |
| GOTO_FIRST_B_P | Send an alarm clear to CNFG that bus A has a primary failure. | FIRST_B |
| GOTO_FIRST_A_P | Send an alarm clear to CNFG that bus B has a primary failure. | FIRST_A |
| GOTO_FIRST_B_S | Send an alarm clear to CNFG that bus A has a secondary failure. | FIRST_B |
| GOTO_FIRST_A_S | Send an alarm clear to CNFG that bus B has a secondary failure. | FIRST_A |
| FAILING | Send BOARD_NOT_RESP to CNFG that resource processor 18, 20, 22. | NO_CARD |
| GOTO_FIRST | Send a set broadcast address message to the resource processor 18, 20, 22. The new address corresponds to the bus in Heartbeat Table. | FIRST_A or FIRST_B |

Heartbeat Table Operation; OFFLINE Switching Module 16 Operation. After a period, preferably every twenty seconds, the LCMH task resets the OFFLINE switching module 16 fields of the Heartbeat Table. The Heartbeat Table response number field is set to 0, and the Heartbeat Table response bus field is set to ESCC2_NO _BUS. Then, within preferably twenty periods, when a valid primary or secondary heartbeat response message has not been received from a resource processor 18,20,22 and the Bus_Id of the response does not match the previous Bus_Id, the Heartbeat Table is updated to indicate the new valid response count and the new bus 24 on which the response was received.

Again, after a period, the OFFLINE switching module 16 slot of the Heartbeat Table is updated based on the Heartbeat Table response number and response bus fields. If a bus 24 fails, an alarm is sent to the CNFG task. If both buses 24 fail, a BOARD_NOT_RESP message is sent to the CNFG task. The following shows the state of this entry based on the responses indicated by the latter tables:

| RESPONSES RECEIVED | STATE |
|---|---|
| Responses on bus A and B | LCOM_OFF_NO_FAIL |
| Response on bus A only | LCOM_OFF_B_FAIL |
| Response on bus B only | LCOM_OFF_A_FAIL |
| No response | LCOM_OFF_ALL_FAIL |

Also, for each bus 24 with no response, an alarm message is sent to the CNFG task, warning it of existing bad OFFLINE switching module buses.

CNFG interfaces. The LCOM application interfaces with the CNFG task through alarm and board_not_responding messages.

When a resource processor 18,20,22 is not responding on bus A or bus B, LCOM send CNFG a BOARD_NOT_RESP message of the following format:

```
typedef struct
{
MSG_HEADER hdr;
BOARD_NOT_RESP_BODY_T body
} BOARD_NOT_RESP_T;
typedef struct
{
UINT2 slot;
} BOARD_NOT_RESP_BODY_T;
```

When a bus failure occurs, CNFG is notified through an alarm message. For switching module 16 OFFLINE bus failures, LCOM uses the Report_Alarm function to send the message:

```
Report_Alarm (UINT2 base_alarm, UINT1 report_status);
```

The following table describes each OFFLINE switching module 16 LCOM base_alarm:

| BASE ALARM | DESCRIPTION |
|---|---|
| ALM_SDM_LCOM_BUS_A_FAIL | Bus A failed on the switching module 16 OFFLINE board |
| ALM_SDM_LCOM_BUS_B_FAIL | Bus B failed on the switching module 16 OFFLINE board |

For resource processor 18,20,22 bus failures, LCOM uses the Report_Remote_Alarm function to send the message (lci is always INVALID_LCI):

```
Report_Remote_Alarm (UINT2 base_alarm, UINT1 report_status, UINT1 slot, UINT4 lci);
```

The following table describes a number of exemplary LCOM base_alarms:

| BASE ALARM | DESCRIPTION |
|---|---|
| ALM_CMN_LCOM_ILLEGAL_PROC_ID | A message with an invalid process id was received by an resource processor 18, 20, 22. |

-continued

| BASE ALARM | DESCRIPTION |
|---|---|
| ALM_CMN_LCOM_ PRIMARY_BUS_A_FAIL | The switching module 16 failed to receive a primary heartbeat response from an resource processor 18, 20, 22 on bus A. |
| ALM_CMN_LCOM_ PRIMARY_BUS_B_FAIL | The switching module 16 failed to receive a primary heartbeat response from an resource processor 18, 20, 22 on bus B. |
| ALM_CMN_LCOM_ SECONDARY_BUS_A_FAIL | The switching module 16 failed to receive a secondary heartbeat response from an resource processor 18, 20, 22 on bus A. |
| ALM_CMN_LCOM_ SECONDARY_BUS_B_FAIL | The switching module 16 failed to receive a secondary heartbeat response from an resource processor 18, 20, 22 on bus B. |

There are also some common alarms that can occur on the switching module 16 and the resource processors 18,20,22:

| COMMON BASE ALARM | DESCRIPTION |
|---|---|
| ALM_CMN_LCOM_ XMIT_BUF_TIMEOUT | A message transmission timeout occurred. |
| ALM_CMN_LCOM_ INIT_MEM_FAIL | Unable to initialize the memory for the LCOM receive and transmit queues. |
| ALM_CMN_LCOM_ ILLEGAL_HB_STATE | Illegal LCOM state |
| ALM_CMN_LCOM_ INT_MSG_LOSS_A | A message was lost on bus A probably due to receive data overrun. |
| ALM_CMN_LCOM_ INT_MSG_LOSS_B | A message was lost on bus B probably due to receive data overrun. |
| ALM_CMN_LCOM_ INT_NO_MSG_BUF | A message was lost due to lack of message storage buffers. |
| ALM_CMN_LCOM_ INVALID_MSG_LENGTH | An attempt to send a message that exceeds the maximum length allowed. |

Described above are a system and method for providing telephony-support functions in a telecommunications switching platform. The telephony-support module preferably provides audio functions including trunk signaling such as MFRL and MFR2, tone generation, digitized announcement record and playback, and tone decoding.

Within a telephony-support module, a microprocessor preferably directs the delivery of these tones and announcements. The microprocessor is preferably connected to volatile and nonvolatile memory and to digital signal processors (DSPs) to provide the tone delivery and announcement functions. The telephony-support module is operable to communicate with other resources and with high-level applications within the telecommunications switching platform through local communications protocols that in one embodiment are provided within the microprocessor.

In one embodiment, the tones and announcements are placed upon high-speed, time-multiplexed buses by the DSPs. The high-speed buses preferably have 128 information channels carrying tones or voice signals at 64 kbps. According to an embodiment of the invention, these tones and/or signals will be placed upon certain timeslots or channels on the high-speed buses. A switch, which is preferably a time-space-time switch, is preferably operable to switch any information channel of one of a plurality of input high-speed buses to any information channel of any one of a plurality of output high-speed buses.

To allow for more efficient system power-up, the telephony-support modules of the present invention preferably have their operating systems stored in a nonvolatile memory that can be reprogrammed without removing it from the system. For instance, the nonvolatile memory might be an Electrically Erasable Programmable Read-Only Memory (EEPROM) or it might be a battery-backed Static Random Access Memory (SRAM), or it might another type of nonvolatile, reprogrammable memory. By keeping the operating system in a nonvolatile memory associated with the telephony-support module, the preferred embodiment platform eliminates the need for a time-consuming download of operating system code into a large number of volatile memories associated with the telephony-support modules in the platform. Instead, each telephony-support controller powers-up ready-to-operate with its own operating code. Then, if necessary, perhaps while the platform is already up and operating, new operating system code can be downloaded and programmed into the nonvolatile memory of the telephony-support modules without interruption to the system or delay in the system power-up.

A few preferred embodiments have been described in detail hereinabove. It is to be understood that the scope of the invention also comprehends embodiments different from those described, yet within the scope of the claims.

For example, the terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory) DRAM (dynamic random access memory), pseudo-static RAM, latches, EEPROM (electrically-erasable programmable read-only memory), EPROM (erasable programmable read-only memory), registers, or other memory devices known in the art. Words of inclusion are to be interpreted as nonexhaustive in considering the scope of the invention.

Aspects of the claimed invention may be applied to switching systems for GSM mobile switches, PCS mobile switches, or in switches primarily used for switching land-based circuits. The telecommunications circuits described in the preferred embodiment were generally E1 or T1 spans, but aspects of the invention could be applied to platforms that switch lower- or higher-bandwidth circuits such as T-2, T-3, or SONET. Also, aspects of the invention could be applied to switch circuits of bandwidths generally equivalent to E1 or T1 but having different framing formats.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A telephony-support module for use in a telecommunications switching platform for switching information channels borne on telecommunications signals connected to telecommunications switching platform, said telephony-support module comprising:

a control bus interface connected to a control bus within said telecommunications switching platform;

a controller connected to said control bus interface, said controller operable to communicate with other elements in said telecommunications switching platform through said control bus interface, said controller further operable to receive a primary heartbeat message as a part of said communication with said other elements and to transmit a primary heartbeat response upon receipt of said primary heartbeat message.

2. The telephony-support module of claim 1 wherein said telephony-support module comprises at least one circuit operable to perform a telephony-support function.

3. The telephony-support module of claim 2 wherein said telephony-support function is a function selected from the group consisting of tone generation, DTMF decoding, MFR1 decoding, MFR2 forward decoding, MFR2 backward decoding, audio storage, and audio playback.

4. The telephony-support module of claim 2 wherein said circuit is a digital signal processor.

5. The telephony-support module of claim 4 wherein said digital signal processor comprises an access buffer and wherein said access buffer is addressable through a direct memory address port and wherein said access buffer is accessed by reference to a pointer buffer containing the location of the address buffer and a map indicating where the various fields of said access buffer are stored relative to said pointer buffer.

6. The telephony-support module of claim 1 wherein said primary heartbeat response includes data sufficient to identify said telephony-support module such that said telecommunications switching platform can compare said data to a table of known resources to determine whether the existence of said telephony-support module had previously been detected by said telecommunications switching platform.

7. The telephony-support module of claim 1 wherein said control bus is a pair of redundant control buses comprising a primary control bus and a secondary control bus.

8. The telephony-support module of claim 7 wherein said telephony-support module is further operable to receive through said control bus interface a secondary heartbeat message, which is received by said control bus interface from said secondary control bus.

9. The telephony-support module of claim 8 wherein said telephony-support module is one of a plurality of resources in the telecommunications switching platform, and wherein a first group of said plurality of resources is operable to use one of the redundant control buses as a primary bus and a second group of said plurality of resources is operable to use the other of the redundant control buses as a primary bus, and wherein said telephony-support module is operable to determine which of said primary heartbeat messages are intended for said telephony-support module.

10. The telephony-support module of claim 9 wherein said control bus interface is operable to determine within said telephony-support module which of said primary heartbeat messages are intended for the group to which said telephony-support module belongs.

11. The telephony-support module of claim 9 wherein said controller is operable to determine within said telephony-support module which of said primary heartbeat messages are intended for the group to which said telephony-support module belongs.

12. The telephony-support module of claim 8 wherein said secondary heartbeat message is addressed to only one telephony-support module.

13. The telephony-support module of claim 12 wherein said control bus interface is operable to determine whether said secondary heartbeat message is addressed to said telephony-support module.

14. The telephony-support module of claim 12 wherein said controller is operable to determine whether said secondary heartbeat message is addressed to said telephony-support module.

15. A telephony-support module for use in a telecommunications switching platform for switching information channels borne on telecommunications signals connected to said telecommunications switching platform, said telephony-support module comprising:

a control bus interface connected to a redundant pair of control buses within said telecommunications switching platform, said redundant pair of control buses comprising a primary control bus and a secondary control bus; and a module controller connected to said control bus interface, said module controller operable to communicate with other elements in said telecommunications switching platform through said control bus interface, said module controller further operable: to receive a primary heartbeat message, which was received by said control bus interface from said primary control bus; to transmit a primary heartbeat response upon receipt of said primary heartbeat message; to receive a secondary heartbeat message, which was received by said control bus interface from said secondary control bus; and to transmit a secondary heartbeat response upon receipt of said secondary heartbeat message.

16. The telephony-support module of claim 15 wherein each of said primary heartbeat response and said secondary heartbeat response is sufficient to identify said telephony-module such that said telecommunications switching platform can compare said data to a table of known resources to determine whether the existence of said telephony-support module had previously been detected by said telecommunications switching platform.

17. The telephony-support module of claim 15 wherein said telephony-support module comprises at least one circuit operable to perform a telephony-support function.

18. The telephony-support module of claim 17 wherein said telephony-support function is a function selected from the group consisting of tone generation, DTMF decoding, MFR1 decoding, MFR2 forward decoding, MFR2 backward decoding, audio storage, and audio playback.

19. The telephony-support module of claim 17 wherein said circuit is a digital signal processor.

20. The telephony-support module of claim 19 wherein said digital signal processor comprises an access buffer and wherein said access buffer is addressable through a direct memory address port and wherein said access buffer is accessed by reference to a pointer buffer containing the location of the address buffer and a map indicating where the various fields of said access buffer are stored relative to said pointer buffer.

21. A telephony-support module for use in a telecommunications switching platform for switching information channels borne on telecommunications signals connected to said telephony-support module, said telephony-support module comprising:

a nonvolatile memory;

another memory;

a local communications controller operable to communicate with other elements in said telecommunications switching platform through a control bus; and a module controller connected to said nonvolatile memory, said another memory, and said local communications controller, said module controller operable to control the operation of said telephony-support module, said module controller further operable: to perform operations according to instructions stored in said nonvolatile memory; to effect the transfer of instructions from said nonvolatile memory to said another memory; to perform other operations according to instructions stored in said another memory; and to effect the loading of new operating instructions from the telecommunication switching platform's higher-level applications into said nonvolatile memory through said local communications controller.

22. The telephony-support module of claim 21 wherein said telephony-support module comprises at least one circuit operable to perform a telephony-support function.

23. The telephony-support module of claim 22 wherein said telephony-support function is a function selected from the group consisting of tone generation, DTMF decoding, MFR1 decoding, MFR2 forward decoding, MFR2 backward decoding, audio storage, and audio playback.

24. The telephony-support module of claim 22 wherein said circuit is a digital signal processor.

25. The telephony-support module of claim 24 wherein said digital signal processor comprises an access buffer and wherein said access buffer is addressable through a direct memory address port and wherein said access buffer is accessed by reference to a pointer buffer containing the location of the address buffer and a map indicating where the various fields of said access buffer are stored relative to said pointer buffer.

26. The telephony-support module of claim 21 wherein said module controller is operable to effect said loading of new operating instructions at substantially the same time as said module controller is performing said other operations according to instructions stored in said another memory.

27. The telephony-support module of claim 26 wherein said module controller is operable to effect said loading of new operating instructions substantially without interruption of its operation according to instruction stored in said another memory.

28. A telephony-support module for use in a telecommunications switching platform for switching information channels borne on telecommunications signals connected to said telecommunications switching platform, said telephony-support module comprising:

a high-speed bus operable to carry a plurality of said information channels;

a bus demultiplexer connected to said high-speed bus, said bus demultiplexer operable to time-demultiplex said plurality of information channels on said high-speed bus onto a plurality of sub-groups of said information channels;

a plurality of digital signal processors, each processor connected to one of said plurality of sub-groups of said information channels;

a nonvolatile memory;

another memory;

a local communications controller operable to communicate with other elements in said telecommunications switching platform through a control bus; and a module controller connected to said bus multiplexer, said plurality of digital signal processors, said nonvolatile memory, said another memory, and said local communications controller, said module controller operable to control the operation of said telephony-support module and the components thereof, said module controller further operable: to perform operations according to instructions stored in said nonvolatile memory; to effect the transfer of instructions from said nonvolatile memory to said another memory; to perform other operations according to instructions stored in said another memory; and to effect the loading of new operating instructions from the telecommunication switching platform's higher-level applications into said nonvolatile memory through said local communications controller.

29. The telephony-support module of claim 28 wherein said module controller is operable to effect said loading of new operating instructions at substantially the same time as said module controller is performing said other operations according to instructions stored in said another memory.

30. The telephony-support module of claim 29 wherein said module controller is operable to effect said loading of new operating instructions substantially without interruption of its operation according to instruction stored in said another memory.

* * * * *